United States Patent
Leggate et al.

(10) Patent No.: US 10,250,161 B1
(45) Date of Patent: Apr. 2, 2019

(54) ADAPTIVE HARMONIC ELIMINATION COMPENSATION FOR VOLTAGE DISTORTION ELEMENTS

(71) Applicant: Rockwell Automation Technologies, Inc., Mayfield Heights, OH (US)

(72) Inventors: David Leggate, New Berlin, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/945,836

(22) Filed: Apr. 5, 2018

(51) Int. Cl.
*H02M 7/5387* (2007.01)
*H02M 5/458* (2006.01)
*H02M 1/38* (2007.01)

(52) U.S. Cl.
CPC ........ *H02M 7/53871* (2013.01); *H02M 5/458* (2013.01); *H02M 2001/385* (2013.01)

(58) Field of Classification Search
CPC ... H02M 7/5387–7/53871; H02M 5/27–5/273; H02M 1/38–2001/385
See application file for complete search history.

(56) References Cited

U.S. PATENT DOCUMENTS

| | | | |
|---|---|---|---|
| 5,625,550 | A | 5/1997 | Leggate et al. |
| 5,917,721 | A | 6/1999 | Kerkman et al. |
| 6,469,916 | B1 | 10/2002 | Kerkman et al. |
| 6,477,067 | B1 | 11/2002 | Kerkman et al. |
| 6,541,933 | B1 | 4/2003 | Leggate et al. |
| 6,617,821 | B2 | 9/2003 | Kerkman et al. |
| 7,649,756 | B2 | 1/2010 | Kerkman et al. |
| 2003/0052642 | A1 | 3/2003 | Kerkman et al. |
| 2006/0192520 | A1 | 8/2006 | Yin et al. |
| 2007/0268051 | A1 | 11/2007 | Kerkman et al. |
| 2007/0268052 | A1 | 11/2007 | Yin et al. |
| 2016/0254760 | A1 | 9/2016 | Zhang et al. |

OTHER PUBLICATIONS

Texas Instruments. Data Manual for TMS320F2810, TMS320F2811, TMS320F2812, TMS320C2810, TMS320C2811, TMS320C2812 Digital Signal Processors . May 2012. pp. 1-177. (Year: 2012).*
Kim et al., "Compensation of Dead-Time Effects Based on Adaptive Harmonic Filtering in the Vector-Controlled AC Motor Drives", IEEE Transaction on Industrial Electronics, vol. 54, No. 3, Jun. 2007, pp. 1768-1777.
Kim et al., "On-Line Dead-Time Compensation Method Using Disturbance Observer", IEEE Transaction on Power Electronics, vol. 18, No. 6, Nov. 2003, pp. 1336-1345.

(Continued)

*Primary Examiner* — Gary L Laxton
*Assistant Examiner* — Peter M Novak
(74) *Attorney, Agent, or Firm* — Fay Sharpe LLP

(57) ABSTRACT

Power conversion systems, methods and control apparatus to operate a power converter, including a processor computes an angle of an AC output current signal, compute a first voltage error that represents an inverter switch dead time voltage error in a synchronous reference frame according to the angle, computes a compensated voltage command according to the first voltage error and according to a voltage control reference, and controls an inverter according to the compensated voltage command.

19 Claims, 23 Drawing Sheets

(56) References Cited

OTHER PUBLICATIONS

Oliveira et al., "Improved Dead-Time Compensation for Sinusoidal PWM Inverters Operating at High Switching Frequencies", IEEE Transaction on INductrial Electronics, vol. 54, No. 4, Aug. 2007, pp. 2295-2304.
Zhao et al., "An Accurate Approach of Nonlinearity Compensation for VSI Inverter Output Voltage", IEEE Transactions on Power Electronics, vol. 19, No. 4, Jul. 2004, pp. 1029-1035.
Urasaki et al. "An Adaptive Dead-Time Compensation Strategy for Voltage Source Inverter Fed Motor Drives", IEEE Transatctions on Power Electronics, vol. 20, No. 5, Sep. 2005, pp. 1150-1160.
Summers et al., "Dead-Time Issues in Predictive Current Control", IEEE Transactions on Industry Applications, vol. 40, No. 3, May/Jun. 2004, pp. 835-844.
Munoz et al., "On-Line Dead-Time Compensation Technique for Open-Loop PWM-VSI Drives", IEEE Transactions on Power electronics, vol. 14, No. 4, Jul. 1999, pp. 683-689.
Cho et al., "A New Switching Strategy for Pulse Width Modulation (PWM) Power Converters", IEEE Transactions on Industrial Electronics, vol. 54, No. 1, Feb. 2007, pp. 330-337.
Choi et al., "Inverter Nonlinearity Compensation in the Presence of Current Measurement Errors and Switching Device Parameter Uncertainties", IEEE Transactions on Power Electronics, vol. 22, No. 2, Mar. 2007, pp. 576-583.
Attaianese et al., "Predictive Compensation of Dead-Time Effects in VSI Feeding Induction Motors", IEEE Transactions on Industry Applications, vol. 37, No. 3, May/Jun. 2001, pp. 856-863.

\* cited by examiner

ADAPTIVE HARMONIC ELIMINATION COMPENSATION FOR VOLTAGE DISTORTION ELEMENTS

TECHNICAL FIELD

The subject matter disclosed herein relates to power conversion systems.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Disclosed examples include power conversion systems, methods and control apparatus to operate a power converter, including a processor computes an angle of an AC output current signal, compute a first voltage error that represents an inverter switch dead time voltage error in a synchronous reference frame according to the angle, computes a compensated voltage command according to the first voltage error and according to a voltage control reference, and controls an inverter according to the compensated voltage command.

BRIEF DESCRIPTION OF THE DRAWINGS

The following description and drawings set forth certain illustrative implementations of the disclosure in detail, which are indicative of one or more exemplary ways in which the various principles of the disclosure may be carried out. The illustrated examples are not exhaustive of the many possible embodiments of the disclosure. Various objects, advantages and novel features of the disclosure will be set forth in the following detailed description when considered in conjunction with the drawings.

DETAILED DESCRIPTION

Figure 1:
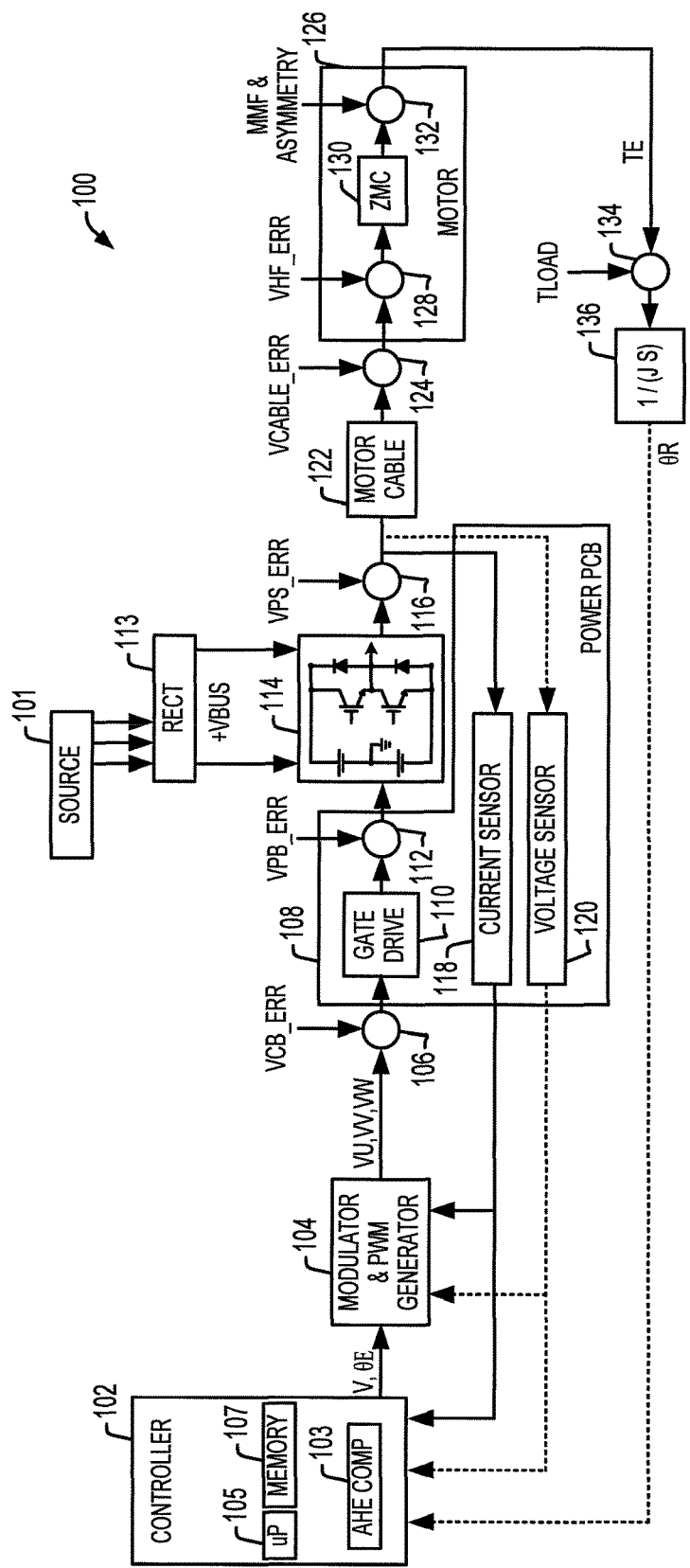
FIG. 1 is a schematic diagram.

Referring now to the figures, one or more example implementations are hereinafter described in conjunction with the drawings, wherein like reference numerals are used to refer to like elements throughout, and wherein the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " As used herein, the terms "couple", "coupled" and "couples" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

FIG. 1 shows an example motor drive power conversion system 100 that converts power from a single or multi-phase source 101. The system 100 includes a controller 102 that implements an adaptive harmonic elimination (AHE) component 103. In one example, the controller 102 includes a processor 105 that executes program instructions stored in an electronic memory 107 to operate the system 100, including executing instructions to implement the adaptive harmonic elimination component 103 as described further hereinbelow. The controller 102 and the components thereof can be any suitable hardware, processor-executed software, processor-executed firmware, logic, or combinations thereof that are adapted, programmed, or otherwise configured to implement the functions illustrated and described herein. The controller 102 in certain embodiments may be implemented, in whole or in part, as software components executed using one or more processing elements, such as the processor 105. The controller 102 may be implemented as a set of sub-components or objects including computer executable instructions stored in the electronic memory 107 for operation using computer readable data executing on one or more hardware platforms such as one or more computers including one or more processors, data stores, memory, etc. The components of the controller 102 may be executed on the same computer processor or in distributed fashion in two or more processing components that are operatively coupled with one another to provide the functionality and operation described herein.

The electronic memory 107 stores the program instructions and the processor 105 is configured to execute the program instructions. The controller 102 includes switch driver circuitry (not shown) to operate switches of a rectifier 113 and an inverter 114 according to rectifier and inverter switching control program instructions executed by the processor 107 to create and maintain a DC bus voltage VBUS and to provide an AC output signal to drive a motor load 126. The rectifier 113 includes an input to receive an AC input signal, and an output to provide the DC bus voltage signal VBUS. The inverter 118 includes an inverter input connected to receive the DC bus voltage signal VBUS, and an inverter output to provide an AC output current signal to drive the motor load 126 through a motor cable 122.

Power conversion systems or power converters operate to convert input electrical energy from one form to another to drive a load. One form of power conversion system is a motor drive for variable speed operation of an electric motor load. Voltage distortion in power converters can cause instability and degraded performance in driving a motor load. Harmonic control and dead time compensation can be used, but current dependency in dead time compensation techniques can degrade stability, particularly for low speed and/or low output torque operation.

The illustrated controller 102 provides converter control apparatus and techniques with current polarity independent adaptive harmonic elimination and dead time compensation via the AHE component 103 to improve waveform quality, mitigate or eliminate instability, and improve motor drive performance, particularly at low operating speeds. Current polarity independence improves low frequency operation and reduces zero clamp current conditions Example implementations in a synchronous reference frame reduce code from three phase to two phase, and certain examples compensate for power device voltage drops and dynamics to account for power device switching and improve the fundamental output voltage.

The system 100 may be subjected to a voltage distortion from variety of sources, as shown in FIG. 1. The controller 102 in FIG. 1 provides a voltage output value V and an electrical angle output θE to a modulator and PWM generator circuit or component 104. The modulator and PWM generator 104 generates three phase voltage signals or values VU, VV and VW according to the voltage output value V and the angle output θE from the PWM generator 104 and also according to a current error value from a current sensor 118 and a voltage error value from a voltage sensor 120. In one implementation, the controller 102 and the PWM generator 104 are implemented in a control board, which is operatively coupled with a power board 108 (labeled POWER PCB in FIG. 1). FIG. 1 shows various voltage noise or distortion sources in the system 100, represented by voltage error signals or values and corresponding adder components. The example voltage distortion sources include a control board voltage error VCB_ERR added to the voltage signals or values VU, VV and VW via and adder 106.

The resulting output signals from the adder 106 are provided to a gate driver circuit 110 of the power board 108. The gate drive circuit 110 provides inverter switching control signals to operate IGBTs or other switches of the inverter 114. In one example, the inverter switching control signals are subject to power board voltage distortion errors shown as an error signal or value VPB_ERR added to the output of the gate driver circuit 110 by a corresponding adder 106. The inverter 118 converts the DC bus voltage VBUS to a single or multi-phase AC output signal. The inverter output signal is subjected to a power source or power supply voltage error signal VPS_ERR via an adder 116 and the resulting signal is provided to the motor cable 122. The motor cable 122 introduces further voltage distortion shown in FIG. 1 as a cable error signal VCABLE_ERR via an adder 124. The signal from the cable 122 is subjected to high frequency distortion shown as an error signal VHF_ERR and a corresponding adder 128. The motor load 126 has an impedance 130 (labeled ZMC), and the driven motor 126 is subject to torque distortion through MMF and asymmetry shown as a signal MMF & ASYMMETRY and a corresponding adder 132. The resulting electrical torque value TE is added to a load torque signal TLOAD by an adder 134 to provide a rotor torque estimate. An integrator component 136 (e.g., labeled 1/JS) provides a rotor angle estimate value θR to the controller 102 according to the estimated rotor torque.

Figure 2:
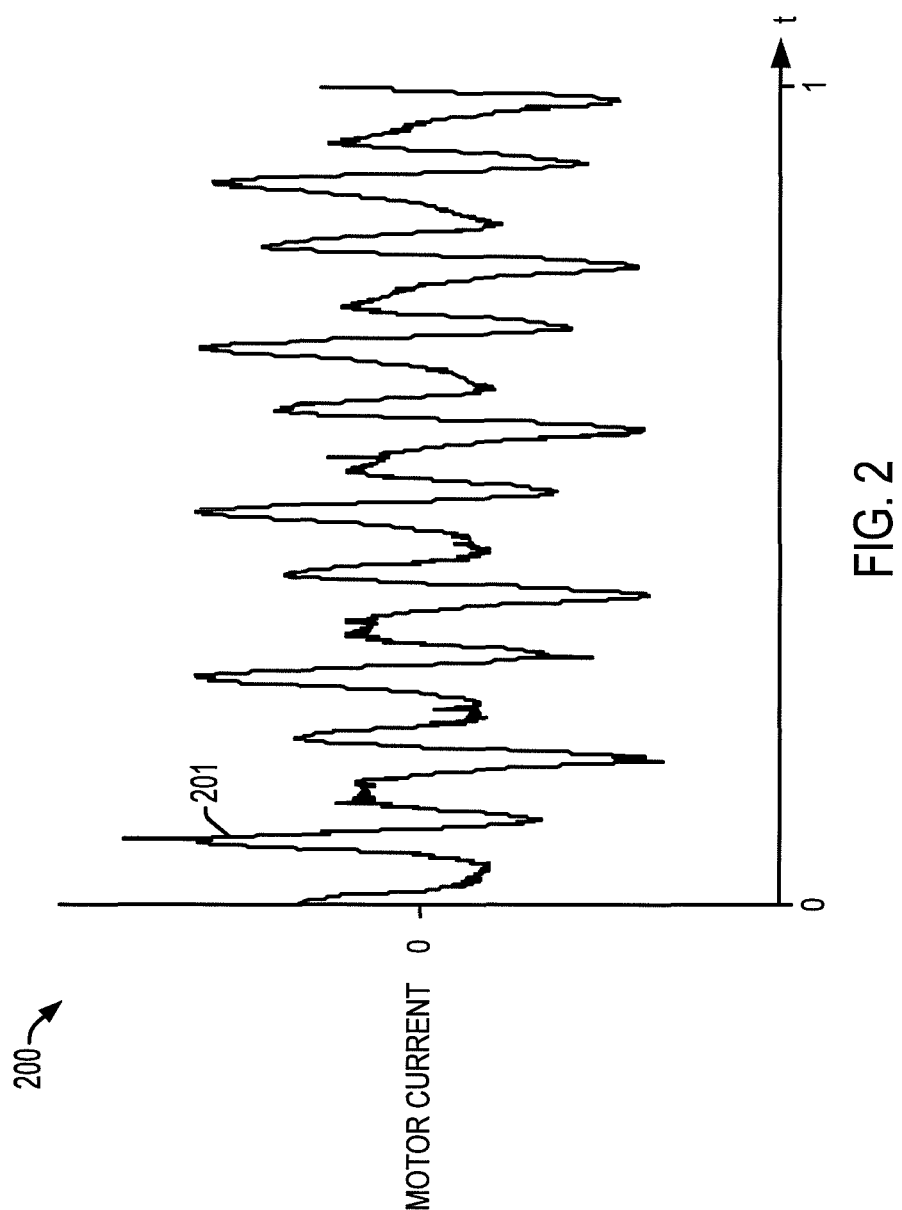
FIG. 2 is a graph.
Figure 3:
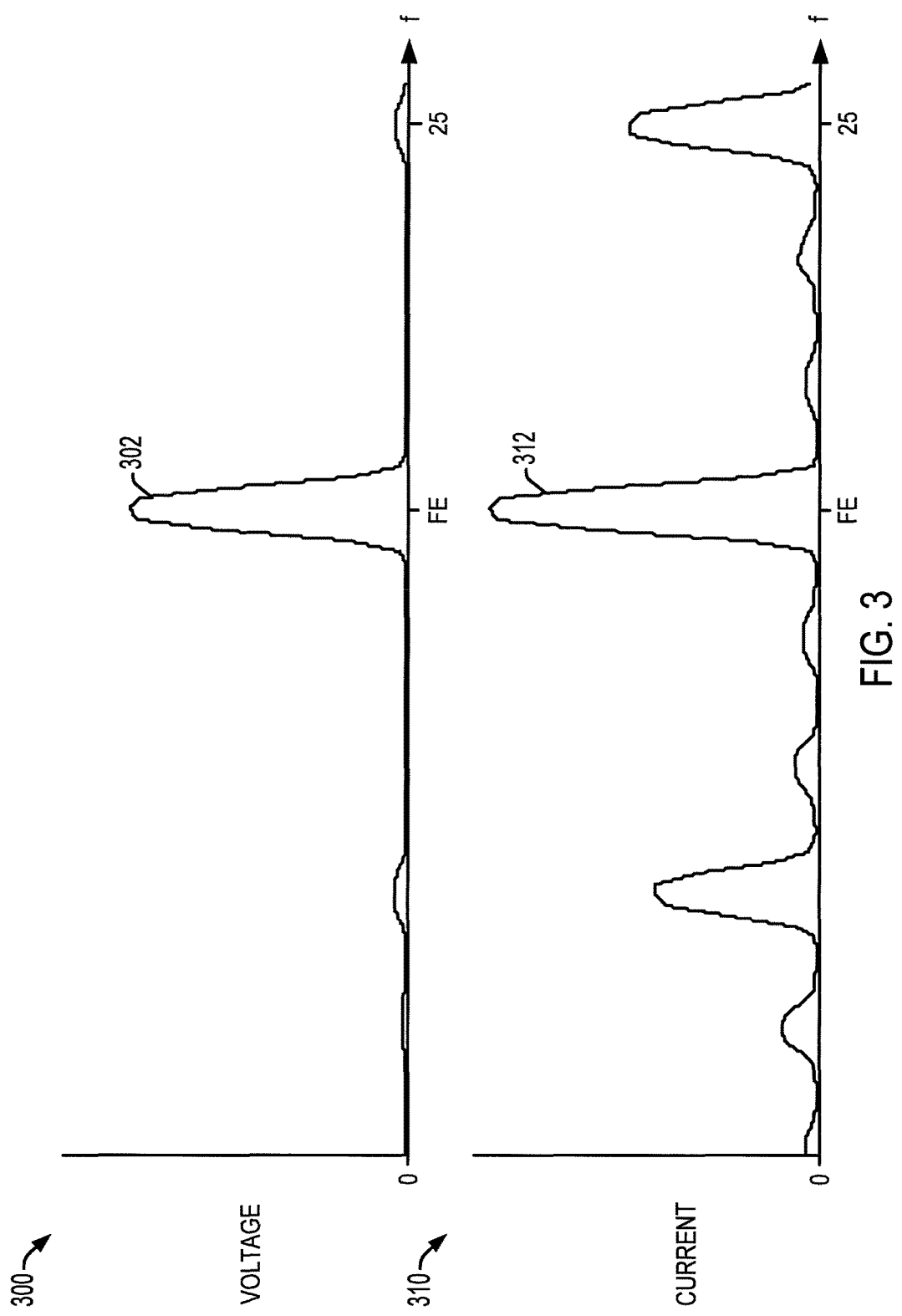
FIG. 3 is a graph.

Referring also to FIGS. 2 and 3, a graph 200 in FIG. 2 shows a motor current curve 201 illustrating the effect of the voltage distortion on the motor current in the conversion system 100 for operation at low motor speed (e.g., 15 HZ with a carrier frequency of 4 kHz). FIG. 3 shows a voltage spectrum graph 300 with a curve 302 showing the voltage amplitude as a function of frequency f, and a spectrum graph 310 shows a current curve 312 as a function of the frequency f. The voltage and current spectrum curves 302 and 312 include fundamental amplitudes for operation of the inverter at an electrical frequency FE (e.g., 15 Hz). The voltage spectrum curve 302 shows non-zero voltage distortion at a sub-harmonic (e.g., 6.5 Hz). The harmonic distortion shown in the voltage curve 302 of FIG. 3 causes significant harmonic distortion in the current curve 312. This is reflected in the unstable motor current curved 201 of FIG. 2. In particular, voltage loss due to the dead time effect associated with the switches of the inverter 114 leads to motor current distortion as shown in FIGS. 2 and 3. In this regard, the voltage errors represented by the distortion sources in FIG. 1 are accumulated over an operating cycle to distort the voltage applied by the inverter 114. As shown in FIG. 1, moreover, the illustrated distortions and instabilities can be caused by more than just the power device dead time effects, and each distortion can create a distortion to the overall system.

Figure 4:
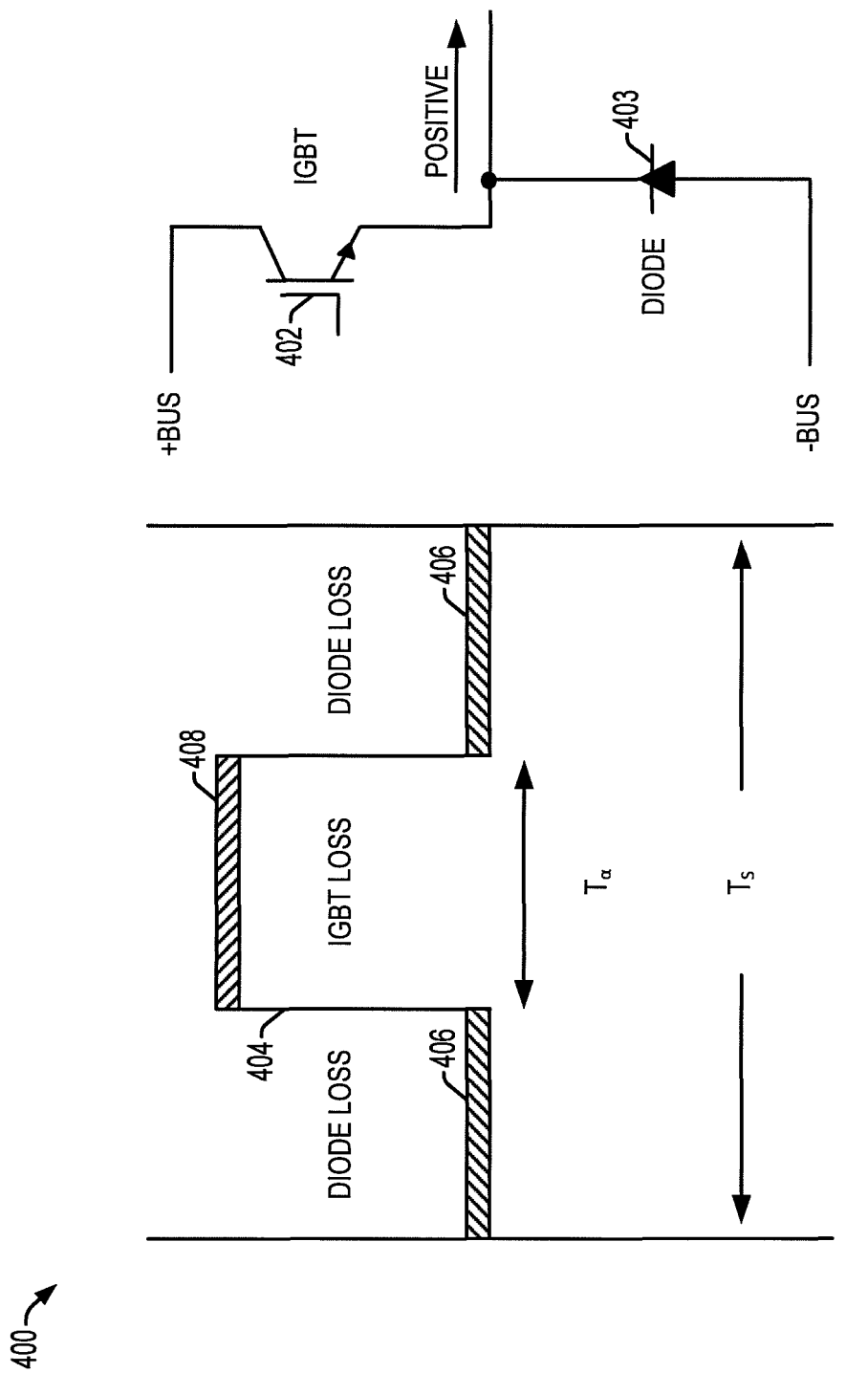
FIG. 4 is a graph.

FIG. 4 shows a graph 400 with a curve 404 that illustrates voltage loss due to the voltage drop of an inverter IGBT 402 and a corresponding reverse recovery diode 403. In operation during a given PWM switching cycle, the system 100 suffers diode loss 406 while the inverter switch 402 is turned off, and IGBT loss while the switch 402 is turned on. Each phase or pole of the inverter contributes to a voltage error with the total power device voltage drop, over a PWM cycle, as a function of the amount of current draw, temperature, and duty cycle. At low operating speeds or low output voltage levels (e.g., low torque operation), the IGBT power device drop becomes a significant contributor to the output voltage error. In certain implementations, the power device voltage drop correction is a positive feedback system and feedforward correction uses information specific to a particular power device.

Figure 5:
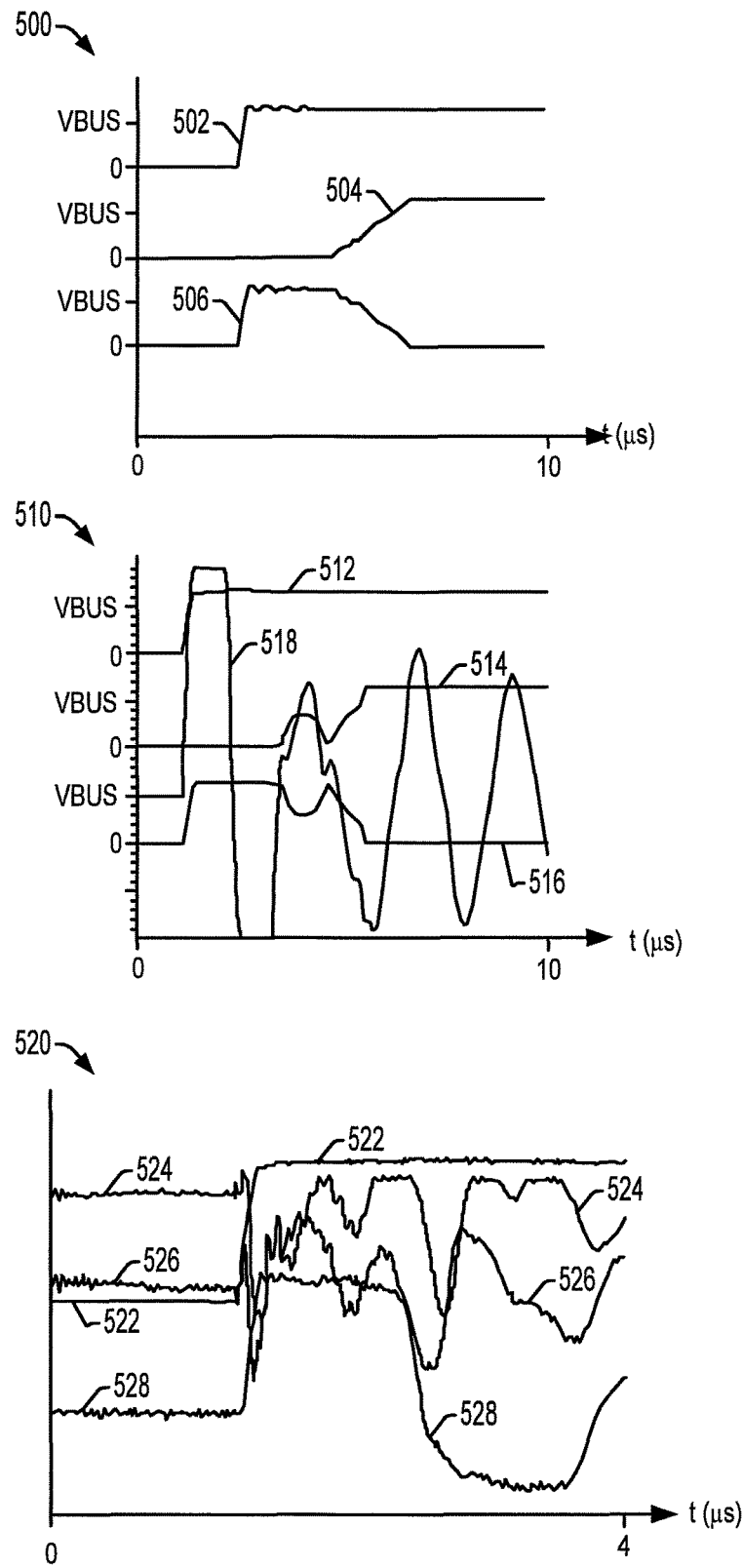
FIG. 5 is a graph.

FIG. 5 shows a graph 500 with a curve 502 that illustrates a first inverter output phase voltage (e.g., phase U) over a single on/off cycle. The graph 500 also includes a curve 504 that shows a second phase voltage (e.g., phase V), and a curve 506 that shows a line-line voltage between phases U and V at low operating frequencies. A graph 510 in FIG. 5 shows a curve 512 that illustrates the first inverter output phase voltage (e.g., phase U) over another example on/off cycle, as well as a curve 514 that shows the second phase voltage (e.g., phase V), and a curve 516 that shows the line-line voltage between phases U and V. The graph 510 also includes a curve 518 that shows a current feedback signal for the first phase (U). The graphs 500 and 510 illustrate the effect of non-ideal switching dynamics, which causes a non-rectangular voltage pulse for the transition of the power device from on to off, which creates an error in the applied voltage. In one example, the controller 102 implements power device dynamic correction to adjust the duty cycle of each output phase as a function of the phase current feedback.

FIG. 5 also includes a graph 520 that illustrates feedback distortion resulting from sensor fidelity limitations for detecting peak currents and voltages. A curve 522 in the graph 520 shows a phase voltage (e.g., phase U), and a curve 524 illustrates a current polarity signal. A curve 526 illustrates a phase current feedback signal (e.g., phase U current from the current sensor 118 in FIG. 1), and a curve 528 illustrates the actual motor phase current provided to the motor load 126. In this example, the current polarity signal (curve 524) is derived from the current feedback signal (curve 526). The noise or lack of fidelity from the current sensor is illustrated by the distortion in the curve 526 compared with the actual motor current curve 528. Where dead time compensation or other feedback or feedforward processing is based on the current polarity, distortion caused by the current sensor can lead to distortion in the current polarity signal (curve 524), and degradation of the dead time compensation.

Figure 6:
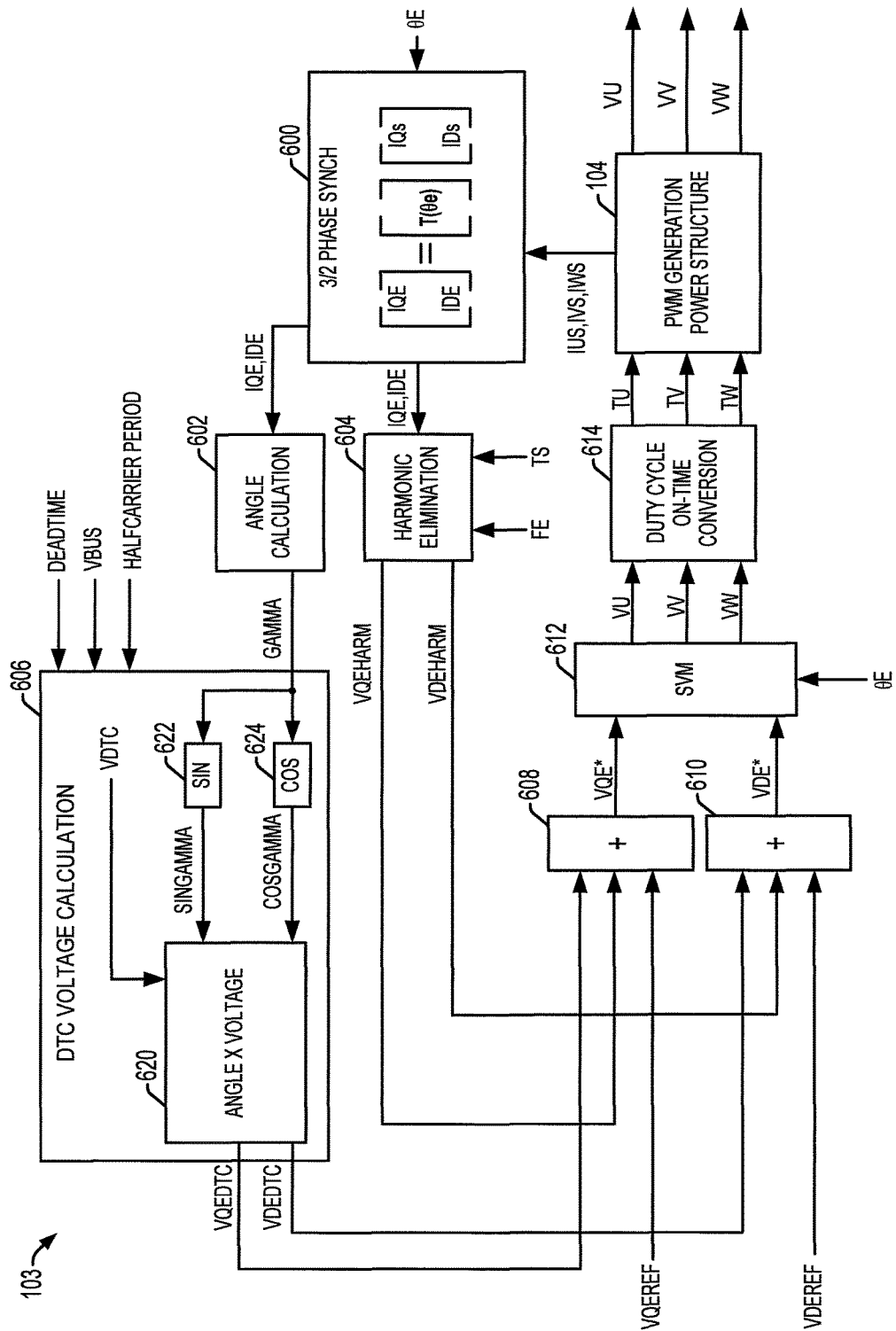
FIG. 6 is a schematic diagram.

FIG. 6 illustrates an example implementation of the adaptive harmonic elimination compensation processing (e.g., component 103 in FIG. 1) implemented by the controller 102. In this example, the PWM generation power structure includes the modulator and PWM generator 104 illustrated in FIG. 1. In one example, the various components illustrated in FIG. 6 are implemented as program instructions stored in the memory 107 and executed by the processor 105 and the controller 102 illustrated in FIG. 1. In the example of FIG. 6, the processing is implemented through computations in a synchronous reference frame, and the processor 105 implements a 3-2 phase synchronous reference frame computation component 600. The synchronous reference frame component 600 receives stationary reference frame current values for each of the three inverter output phases, labeled IUS, IVS and IWS, and computes the corresponding inverter output current values IQE, IDE in a synchronous (e.g., d,q) reference frame. In the illustrated example, the synchronous reference frame component 600 generates DC components with amplitudes that correspond to torque (q-axis) and flux (d-axis) and any harmonics if present. The synchronous reference frame output current values IQE and IDE are provided to an angle calculation component 602 and a harmonic elimination component 604.

The angle calculation component 602 computes an angle GAMMA of the AC output current signal IUS, IVS, IWS according to (e.g., in response to or based upon) the synchronous reference frame output current values IQE and IDE. The processor 105 implements a dead time compensation (DTC) voltage calculation component 606 that uses the angle GAMMA from the angle calculation component 602 to compute a first voltage error VQEDTC, VDEDTC that represents inverter switch dead time voltage error in the synchronous reference frame. The DTC voltage calculation component 606 includes an angle x voltage component 620, a sine function 622 and a cosine function 624. The sine component 622 computes a sine value SINGAMMA, and the cosine component 624 computes a cosine value COSGAMMA of the angle GAMMA. The angle x voltage component 620 computes the first voltage error values VQEDTC, VDEDTC in the synchronous reference frame that represents inverter switch dead time voltage error by multiplying a dead time compensation voltage value VDTC by the values SINGAMMA and COSGAMMA. In the illustrated example, the DTC voltage calculation component 606 also operates according to a dead time value DEADTIME, the DC bus voltage value VBUS, and a half carrier period value HALFPERIOD.

The processor 105 implements summation component 608 and 610 to compute a compensated voltage command VQE*, VDE* in the synchronous reference frame according to the first voltage error VQEDTC, VDEDTC and according to a voltage control reference VQEREF, VDEREF. In one example, the synchronous reference frame voltage control reference values VQEREF, VDEREF are provided from an outer control loop, such as a current control loop or a torque control loop. In one implementation, the controller 102 operates according to a speed set point reference to control the speed of the motor load 26, and the controller 102 implements a speed control loop with one or more inner control loops, including a voltage control loop.

The processor 105 controls the AC output of the inverter 118 according to the compensated voltage command VQE*, VDE* using a space vector modulation (SVM) component 612 that operates according to an electrical phase angle value θE, a duty cycle on-time conversion component 614 and the PWM generation power structure component 104. In the illustrated example, the SVM component 612 generates stationary reference frame voltage values VU, VV and VW and the phase angle value θE, and provides these to the duty cycle on-time conversion component 614. The component 614 generates on times TU, TV and TW for the individual phases of the inverter 114, and the power generation power structure component 104 includes the modulator and PWM generator circuitry as described above in connection with FIG. 1 to provide switching control signals to operate the IGBTs of the inverter 114.

Figure 7:
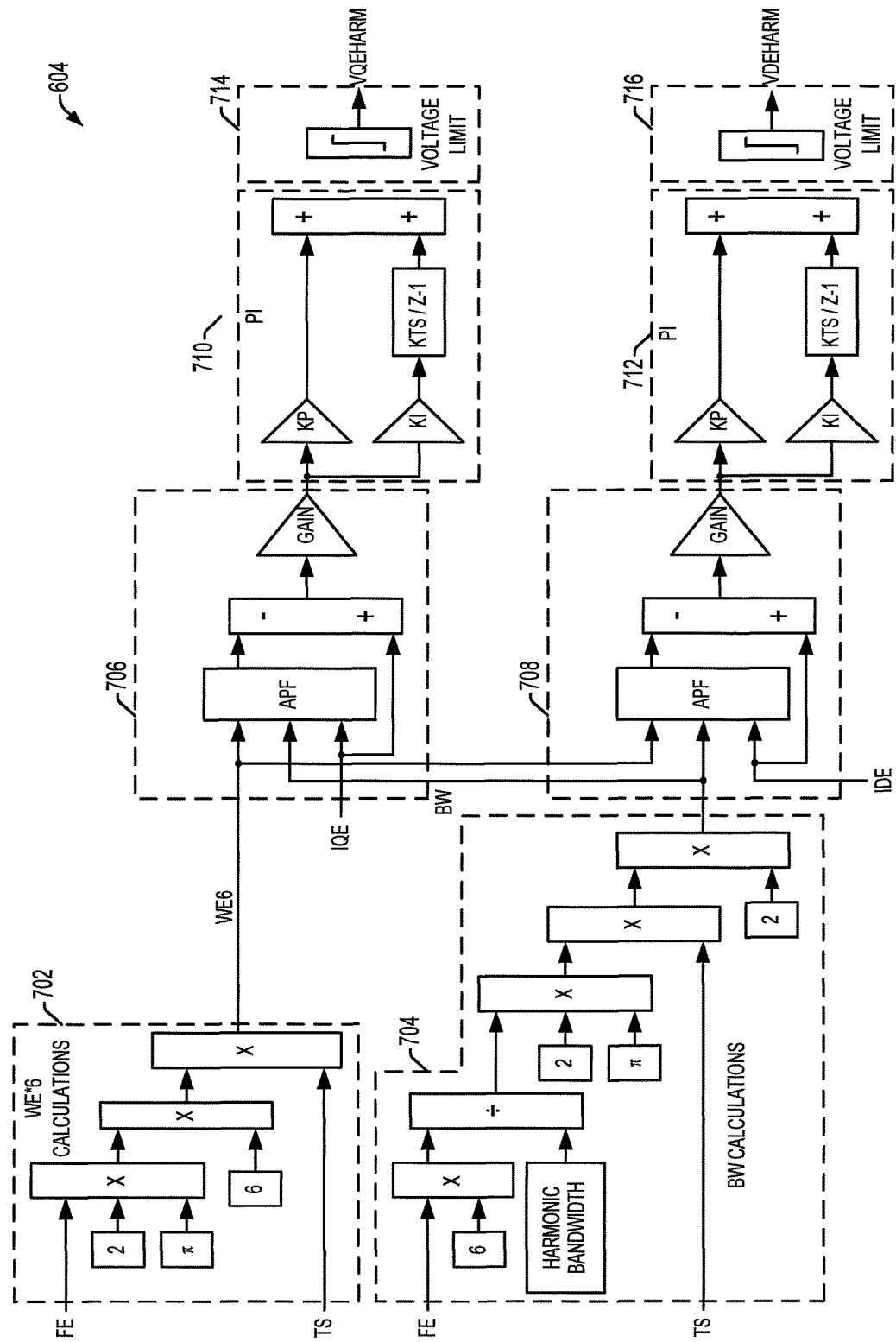
FIG. 7 is a schematic diagram.

Referring also to FIG. 7, the harmonic elimination component 604 in one example reduces or cancels the effects of the fifth and seventh harmonics in the inverter phase currents in the stationary reference frame and compensates for the distortions in the dominant fundamental harmonic and the sixth harmonic component of the inverter phase currents in the synchronous reference frame. The harmonic elimination component 604 provides q-axis and d-axis correction, where the harmonic compensation is implemented in a feedback loop. The inputs to the harmonic elimination component 604 are the synchronous current feedback values IDE and IQE, the operating frequency FE, and the task rate time TS. The processor 105 in the illustrated example also implements the harmonic elimination component 604 to compute a second voltage error VQEHARM, VDEHARM that represents a harmonic voltage error in the synchronous reference frame according to the angle GAMMA, and according to an operating frequency FE of the inverter 118. The synchronous reference frame second voltage error values VQEHARM, VDEHARM are provided as inputs to the summation components 608 and 610. In this example, the processor 105 computes the compensated voltage command VQE*, VDE* according to the first voltage error VQEDTC, VDEDTC, according to the second voltage error VQEHARM, VDEHARM, and according to the voltage control reference VQEREF, VDEREF. In one example, the harmonic elimination component 604 also operates according to a task rate value TS that represents a processing rate of the processor 105.

FIG. 7 shows further details of an example implementation of the harmonic elimination component 604. The harmonic elimination component 604 in one example is implemented in the feedback loop, and operates to cancel the effects of fifth and seventh harmonics in the inverter phase currents in the stationary reference frame, and to compensate for distortions in fundamental harmonic and the sixth harmonic in the synchronous reference frame. In one example, transformed currents are filtered by filtering to remove a six times ωe harmonic content, and the output of PI control components provides an error voltage which is scaled and limited. Bandwidth calculations are predetermined and remain constant for all operating frequencies in one implementation. The harmonic elimination component 604 in this example includes a sixth harmonic calculation component 702 that receives the inverter electrical operating frequency value FE and the task rate value TS. The component 702 multiplies the operating frequency value FE by $2\pi$, and multiplies the resulting value by 6 in order to provide a value that represents a sixth harmonic of the current operating frequency FE of the inverter 118. The sixth harmonic value in one example is multiplied by the task rate value TS to provide an output WE6 of the sixth harmonic calculation component 702.

The harmonic elimination component 604 also includes a bandwidth calculation component 704 that receives the inverter electrical operating frequency value FE and the task rate value TS. The component 704 multiplies the operating frequency value FE by 6, and divides the result by a harmonic bandwidth value (e.g., labeled HARMONIC BANDWIDTH in FIG. 7). The result is multiplied by $2\pi$, and this further result is multiplied by the task rate value TS, and then by 2 in order to provide a bandwidth value BW. In one example, the processor 105 executes the program instructions 103 to compute the second voltage error VQEHARM, VDEHARM that represents a harmonic voltage error at a sixth harmonic of the operating frequency FE of the inverter 118 in the synchronous reference frame. In this example, moreover, the voltage error values VQEHARM, VDEHARM represent the harmonic voltage error at the fifth harmonic and seventh harmonic of the operating frequency FE of the inverter 118 in the stationary reference frame.

The synchronous current feedback IQE, IDE is input to filter components that reduce or eliminate the sixth harmonic component. In one example, a second order all-pass notch filter reduces/eliminates the undesired harmonic component in the inverter phase feedback currents IQE, IDE. The filter in one example has a fast response to disturbances in the inverter phase feedback currents IQE, IDE and provides improved waveform quality and stable operation, particularly at low operating frequencies. PI control components convert the filtered synchronous current to a compensation voltage with scaling and limits applied. The example harmonic elimination component 604 in FIG. 7 includes filter components 706 and 708 to separately apply the sixth harmonic value WE6 and the bandwidth value BW to the synchronous reference frame output current values IQE and IDE. The component 706 and 708 each include a bandpass filter (BPF) component that implements a bandpass filter centered at the sixth harmonic frequency WE6 from the component 702, with a filter bandwidth set by the bandwidth value BW from the bandwidth component 704. The first filter component 706 subtracts a filtered sixth harmonic value from the BPF component from the q-axis current feedback value IQE, and multiplies the result by a gain (labeled GAIN) to provide an output from the component 706. The second filter component 708 include similar components to perform bandpass filtering and sixth harmonic elimination from the d-axis current feedback value IDE.

The harmonic compensated values provided by the filter components 706 and 708 are individually provided to corresponding proportional integral (PI) control components 710 and 712. The PI components 710, 712 operate according to a proportional gain value KP and an integral gain value KI. The outputs of the PI components 710 and 712 are subtracted from the respective synchronous reference frame output current values IQE and IDE and the results are provided to limiter components 714 and 716 that respectively provide the second voltage error values VQEHARM, VDEHARM in the synchronous reference frame.

Figure 8:
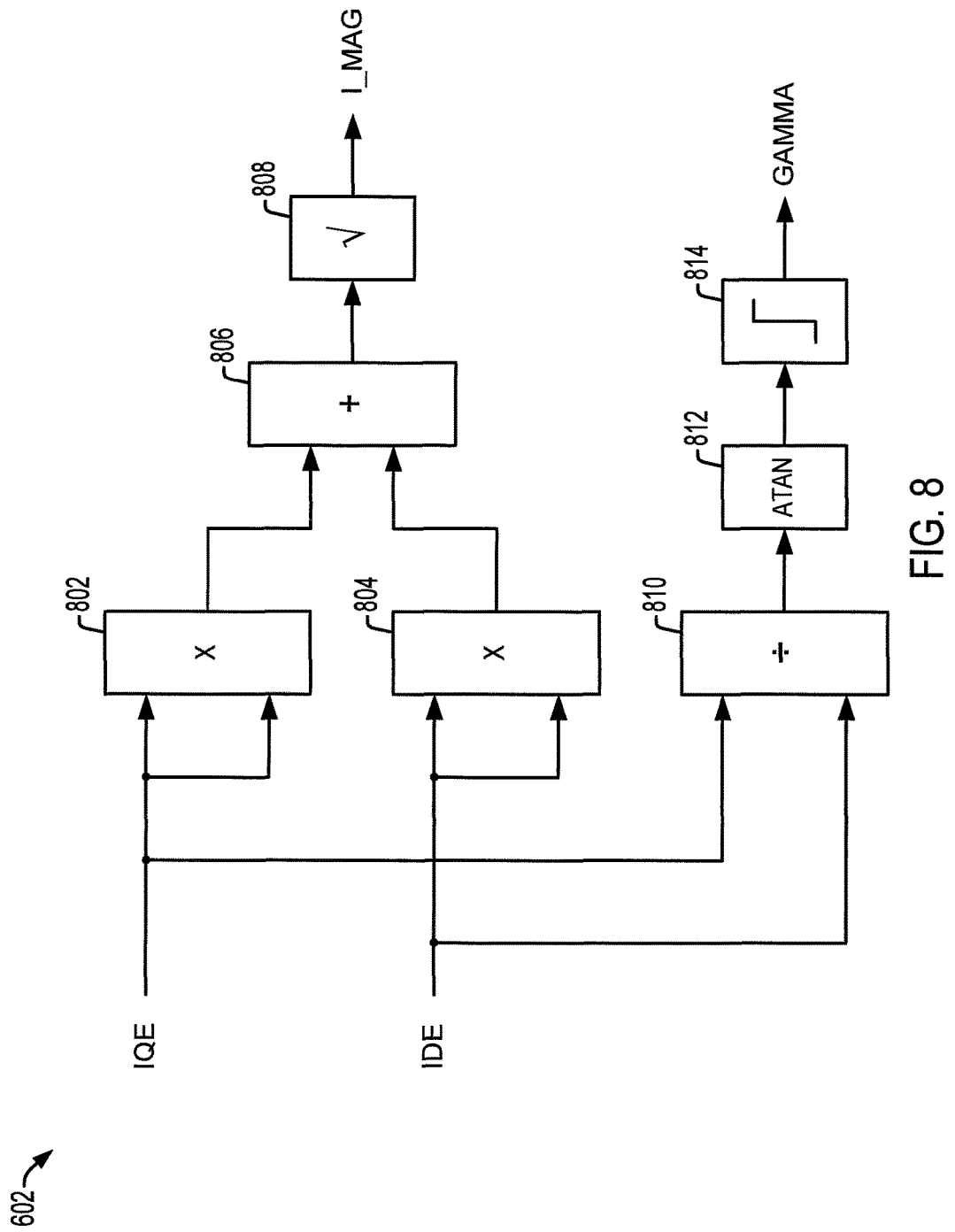
FIG. 8 is a schematic diagram.

FIG. 8 shows further details of an example implementation of the angle calculation component 602 by the processor 105. The current angle calculation component 602 calculates the current angle GAMMA ($\gamma$) according to the synchronous feedback currents IQE and IDE. IQE and IDE are squared by multiplication components 802 and 804 and the results are added together by an adder component 806 to provide a value representing the sum of squares of the synchronous feedback currents. A square root component 808 computes a current magnitude value I_MAG as the square root of the sum of the squares of the synchronous feedback currents. The processor 105 in one example evaluates the current angle according to the following formulas: $\varphi=\int \omega e dt + \gamma = \theta E + \gamma$, and $\gamma=\text{TAN}-1(\text{IQE}/\text{IDE})$. The processor 105 computes the current angle (GAMMA or $\gamma$) as the arctangent of the ratio of the q-axis current IQE to the d-axis current IDE using a divider component 810 and an arctangent component 812. A limiter component 814 enforces limits on the angle value $\gamma$, and provides the angle signal or value GAMMA for use in the dead time compensation via the component 606.

Figure 9:
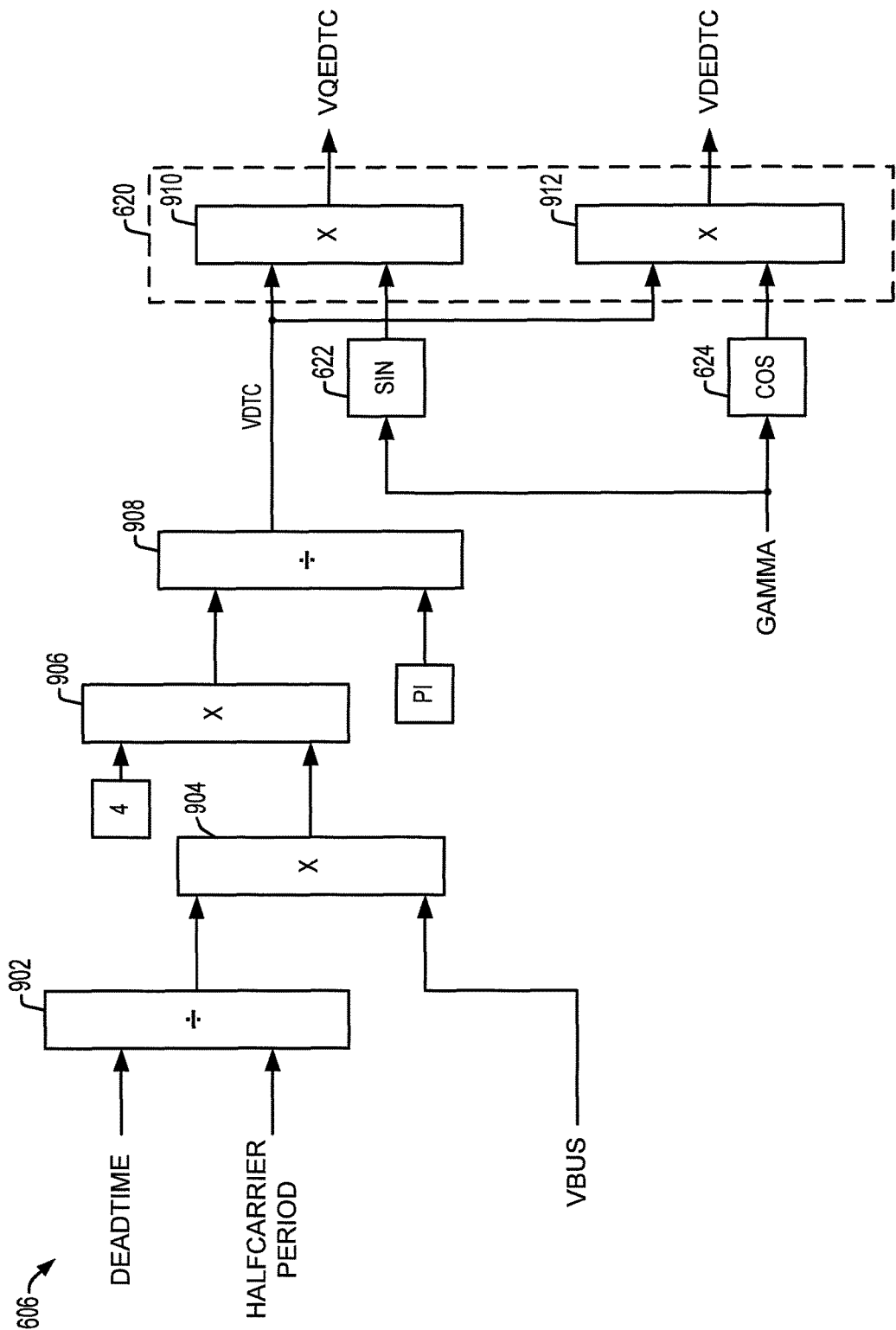
FIG. 9 is a schematic diagram.

FIG. 9 illustrates details of an example implementation of the dead time compensation voltage calculation component 606. In one example, the processor 105 computes the first voltage error VQEDTC, VDEDTC independent of a polarity of the AC output current signal IUS, IVS, IWS to provide the dead time compensation in a feed forward loop to correct for the effects of power device dead time. In this manner, the illustrated examples mitigate or avoid current polarity dependency problems, even where a current feedback sensor (e.g., sensor 118 in FIG. 1) is subjected to noise or distortion (e.g., as shown in FIG. 5).

In the example of FIG. 9, the processor 105 computes the first voltage error VQEDTC, VDEDTC by multiplying the angle GAMMA by the dead time compensation voltage. The effective turn-on time error over a half PWM period can be obtained by the following equation: VDT=(TD/(TC/2))*VBUS, where TD is the dead time and TC/2 is the carrier half carrier period. The dead time compensation voltage calculation component 606 in one example operates according to a dead time value DEADTIME, the DC bus voltage VBUS, and the angle GAMMA. In the example of FIG. 9, the dead time value DEADTIME is divided by the half carrier period value HALFCARRIER PERIOD (e.g., in seconds) by a divider component 902, and the result is multiplied by the DC bus voltage value VBUS using a multiplier component 904. The multiplication result is multiplied by 4 using a multiplier component 906, and the result is divided by $\pi$ using a divider component 908. The divider component 908 outputs the dead time compensation voltage value VDTC for multiplication by the components of the angle GAMMA. The angle x voltage component 620 includes a multiplier 910 that multiplies the dead time compensation voltage value VDTC by the sine of the angle GAMMA from the sine component 622 to compute the first voltage error value VQEDTC, and a multiplier 912 multiplies VDTC by the cosine of the angle GAMMA from the cosine component 624 to compute the first voltage error value VDEDTC.

Inverter output voltage distortions associated with dead time effects are seen in the phase currents, as seen in FIG. 3 above. The voltage error in one example includes a fundamental and odd harmonics, where the fifth and seventh harmonics are particularly dominant. After the transformation to the synchronous reference frame, the sixth harmonic is dominant. The dead time voltage errors V are in phase with the phase currents and can be represented by the following equation: $V=((4*\text{VDT})/\pi)$. Transformation of the compensation voltages in the synchronous reference frame results in the following formula: $[(\text{VDEDTC})/(\text{VQEDTC})]=((4*\text{VDT})/\pi)*[(\cos\gamma)/(\sin\gamma)]$. In this example, moreover, the current polarity is not required for dead time compensation in the controller 102.

As seen above in FIGS. 6-9, the processor 105 of the controller 102 implements the AHE component 103 to facilitate improved low speed performance with improved inverter current feedback waveform quality, while achieving current polarity independence. The disclosed examples facilitate reduced or eliminated distortions and instabilities associated with the power device switching and the power device dead time and other effects in the system 100, such as errors from the control board, errors from the power layer board, errors from the power supplies, errors due to cables, and errors from machine dynamics and noisy feedback sensors.

Figure 10:
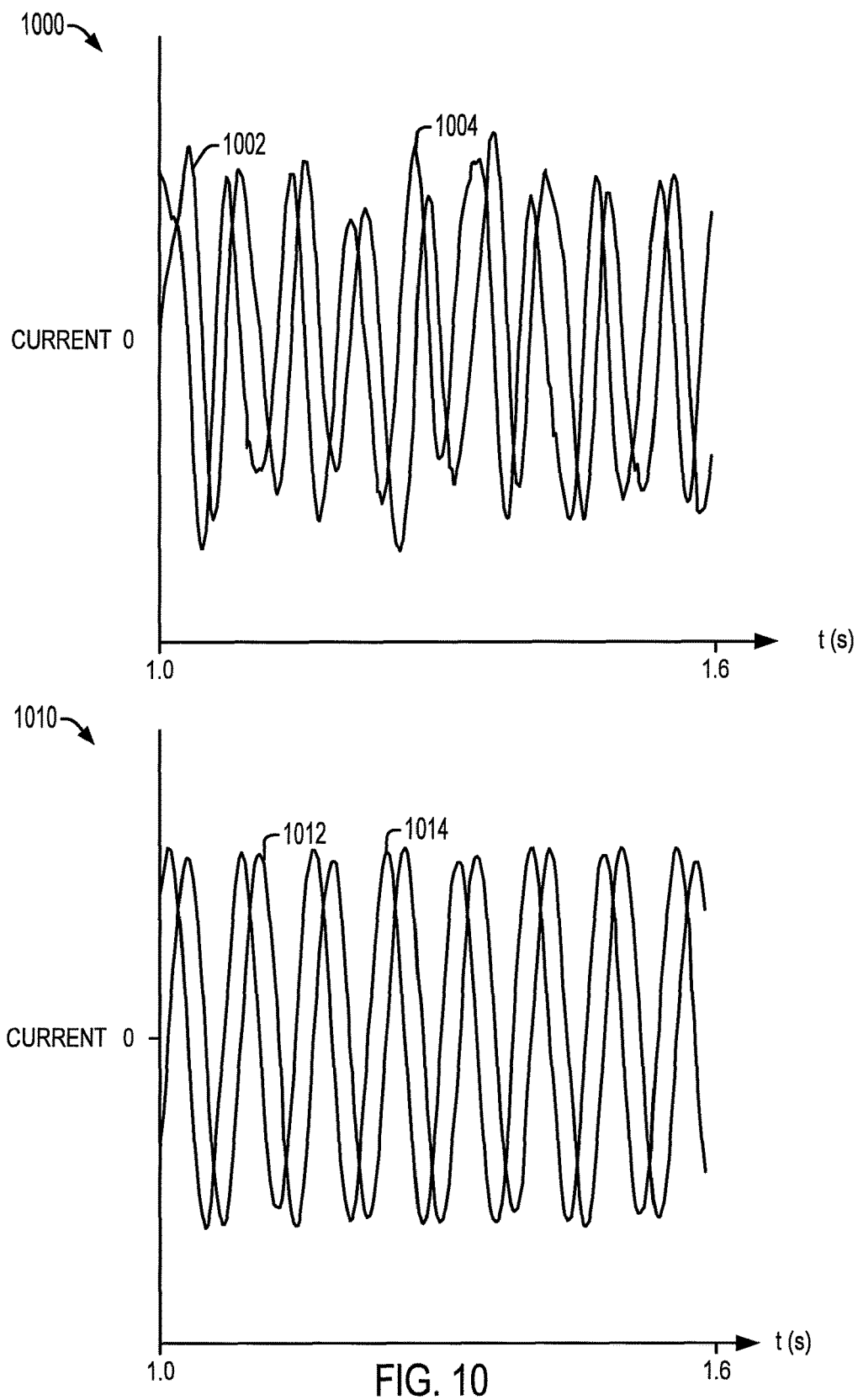
FIG. 10 is a graph.
Figure 11:
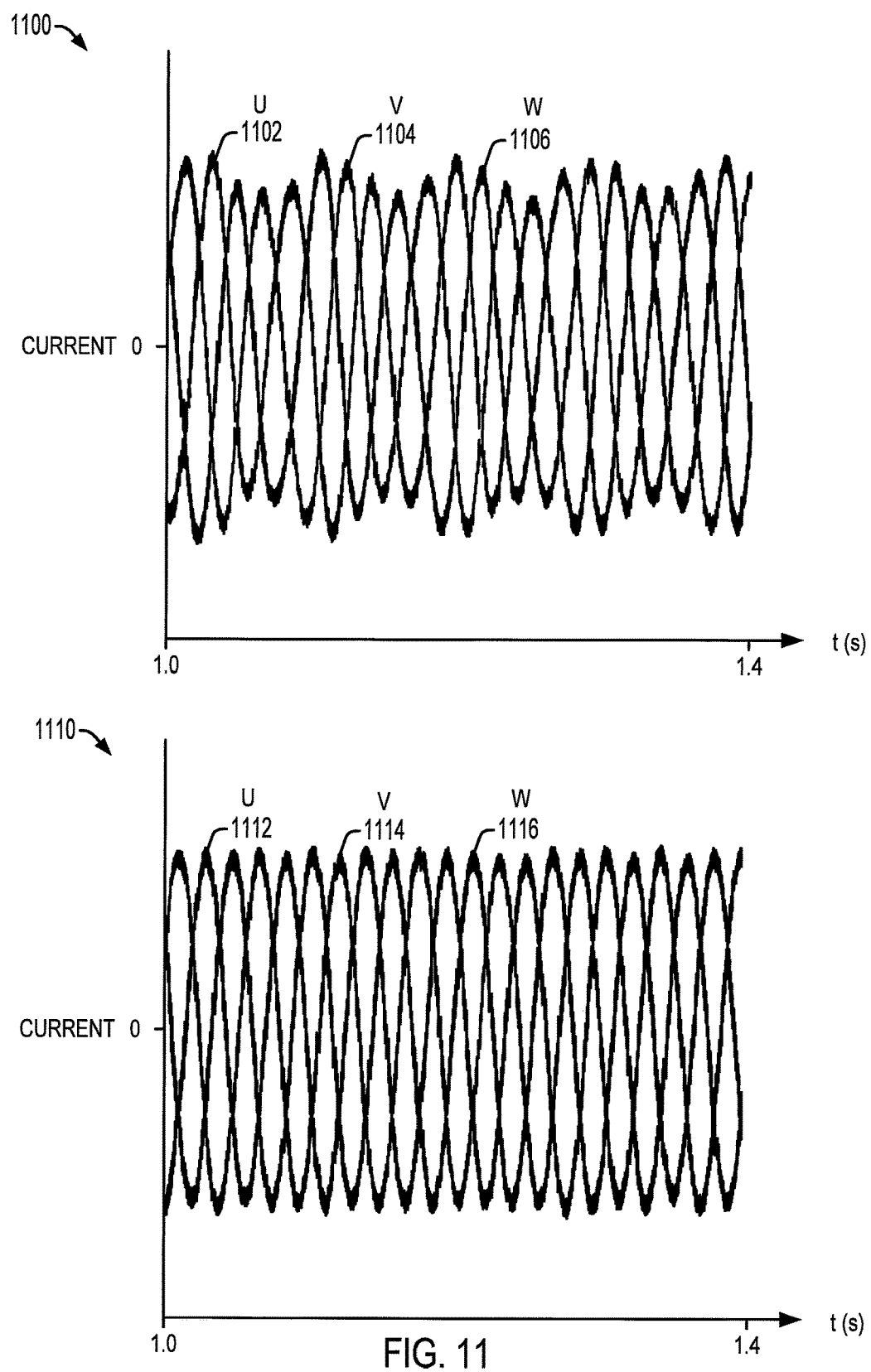
FIG. 11 is a graph.
Figure 12:
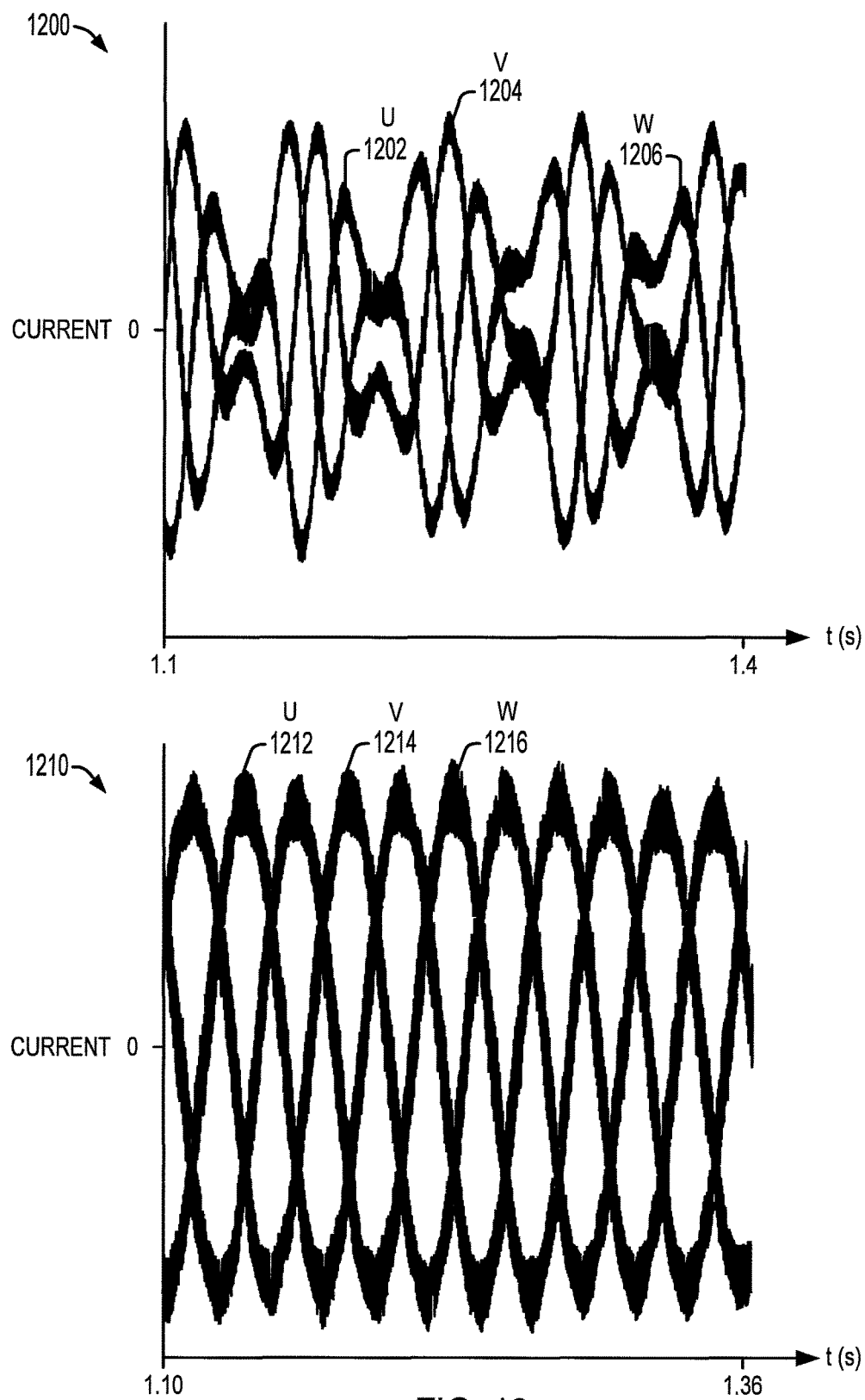
FIG. 12 is a graph.

FIGS. 10-12 illustrate simulation results showing the performance improvements of the adaptive harmonic elimination compensation techniques implemented by the controller 102. FIG. 10 provides a graph 1000, including two example phase current curves 1002 and 1004 without the adaptive harmonic compensation component 103, and a graph 1010 shows corresponding curves 1012 and 1014 with the processor 105 implementing the adaptive harmonic elimination component 103 for a 15 HP motor operating at 15 Hz no load, 1 µsec dead time, and a 4 kHz carrier frequency. With no compensation (graph 1000) the motor currents (curves 1002 and 1004) are unstable. With the adaptive harmonic elimination compensation active in the graph 1010, the motor currents are stable (curves 1012 and 1014).

FIG. 11 includes graphs 1100 and 1110 showing operation of a 15 hp motor operating at 18 Hz, with an increased dead time of 2 µs and a 4 kHz carrier frequency, where increasing dead time can increase instability regions. The graph 1100 includes three phase inverter output current curves 1102 (U), 1104 (V) and 1106 (W) that exhibit unstable operation in the motor currents with no adaptive harmonic compensation. The graph 1110 includes three inverter output current curves 1112 (U), 1114 (V) and 1116 (W) with the processor 105 implementing the adaptive harmonic elimination compensation component 103 for stable operation.

Referring now to FIG. 12, larger motors are generally more difficult to stabilize than smaller motors. FIG. 12 includes graphs 1200 and 1210 showing comparative operation for a 200 HP motor operating at 15 Hz with a 2 µs dead time and a 2 kHz carrier frequency. The graph 1200 includes three phase inverter output current curves 1202 (U), 1204 (V) and 1206 (W) that exhibit unstable operation in the motor currents with no adaptive harmonic compensation. The graph 1210 includes three inverter output current curves 1212 (U), 1214 (V) and 1216 (W) with the processor 105 implementing the adaptive harmonic elimination compensation component 103 for stable operation.

Figure 13:
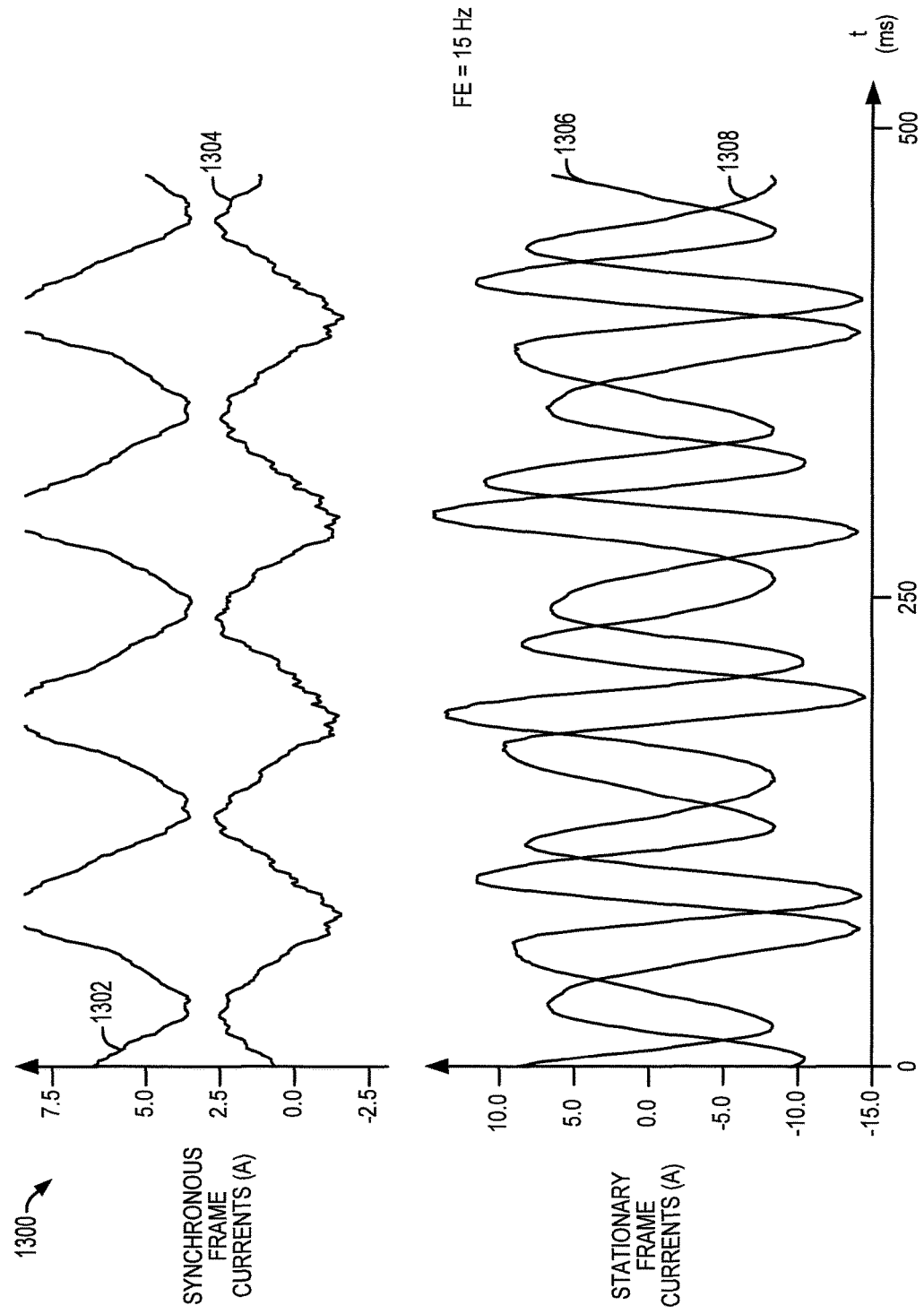
FIG. 13 is a graph.
Figure 14:
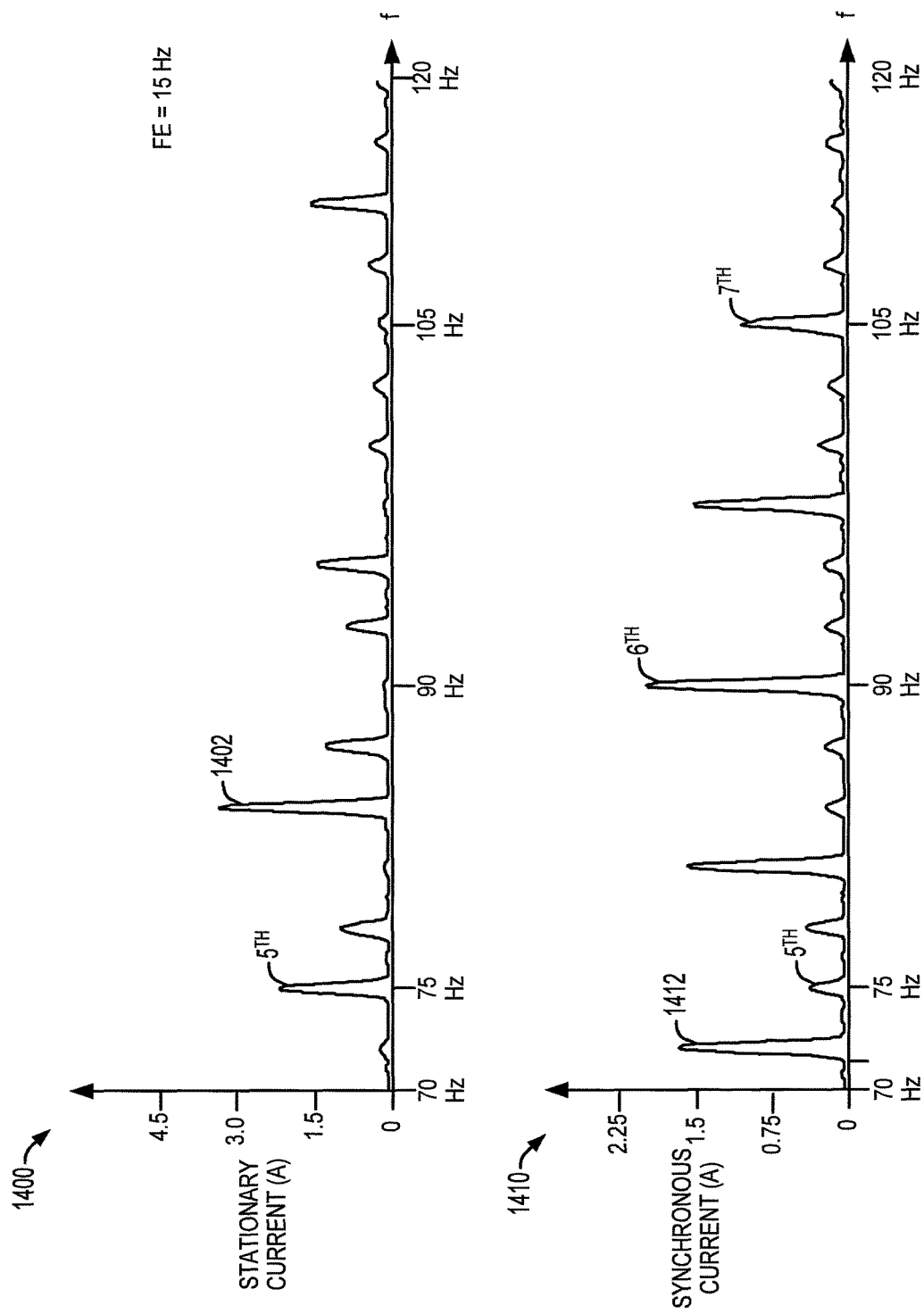
FIG. 14 is a graph.

FIGS. 13-18 show laboratory testing results on a 15 HP inverter, operating at 15 Hz with a 15 HP motor unloaded. A graph 1300 in FIG. 13 shows results without the adaptive harmonic compensation described above, including a curve 1302 showing the d-axis current IDE and a curve 1304 showing the q-axis current IQE, as well as curves 1304 and 1306 showing two example inverter output phase currents (e.g., phases U and V). With no adaptive harmonic compensation, the current signals in the graph 1300 exhibit high amounts of distortion and instability. FIG. 14 includes a graph 1400 with a curve 1402 showing the stationary reference frame current spectrum as a function of frequency f (FE and DC not shown), as well as a graph 1410 with a curve 1412 showing the synchronous reference frame current for the operating conditions illustrated in FIG. 13 (e.g., without adaptive harmonic compensation). As seen in the graphs 1400 and 1410, the harmonic distortion components are significant without the adaptive harmonic compensation of the above examples.

Figure 15:
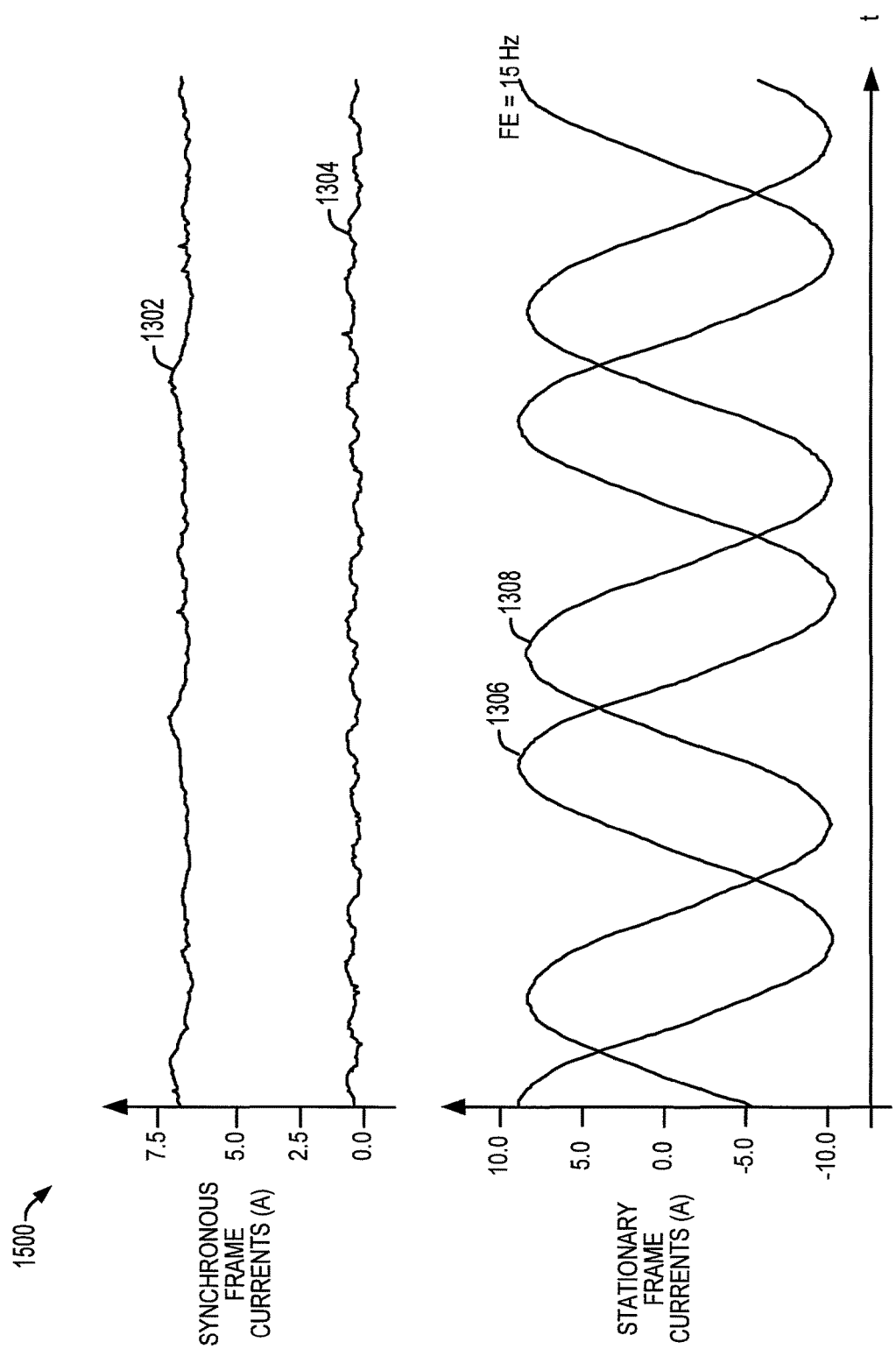
FIG. 15 is a graph.
Figure 16:
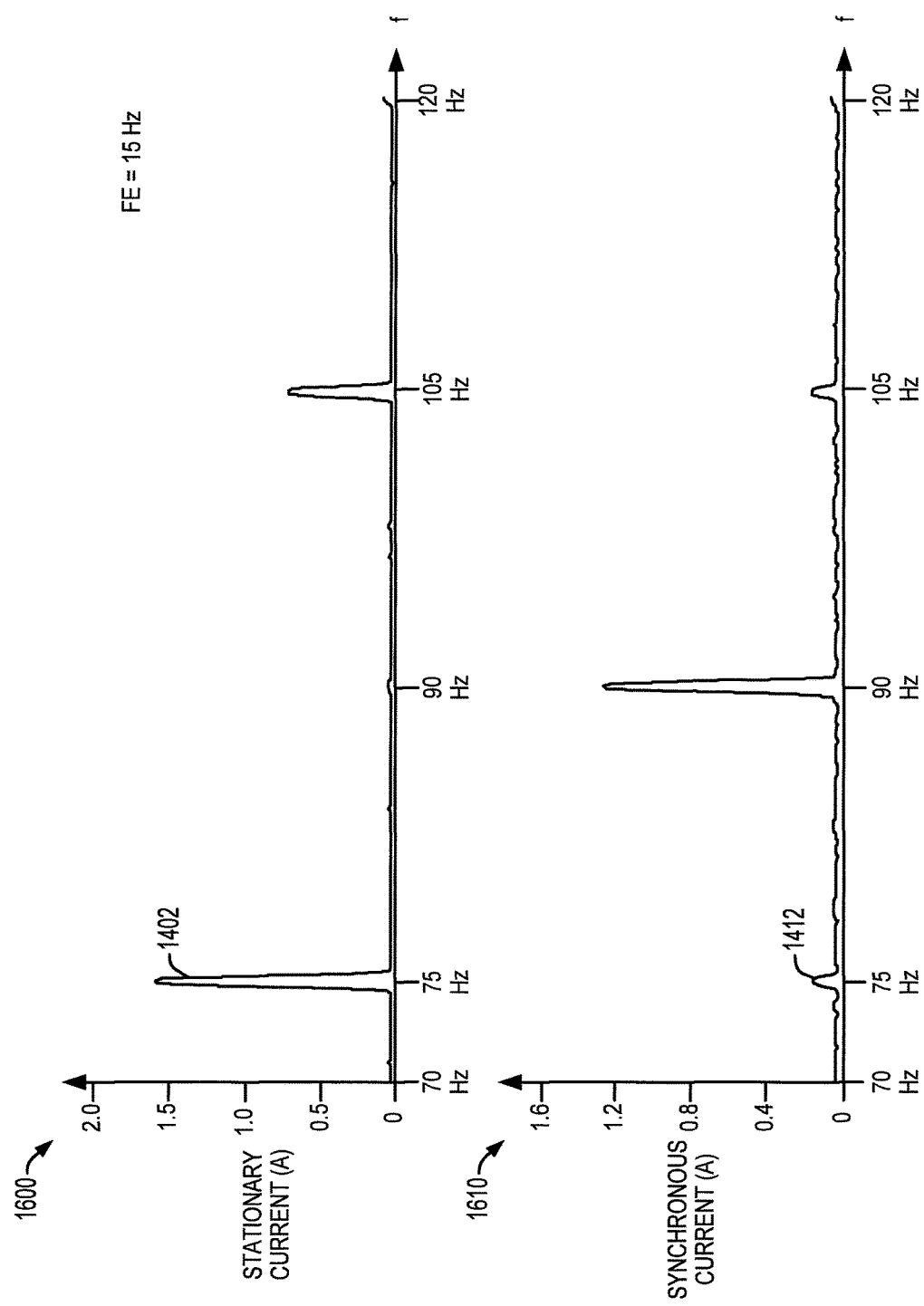
FIG. 16 is a graph.

FIG. 15 shows a graph 1500 including a curve 1302 illustrating the d-axis current IDE, a curve 1304 showing the q-axis current IQE, and curves 1304 and 1306 showing two example inverter output phase currents (e.g., phases U and V), using the above-described adaptive harmonic compensation component 103 implemented by the control processor 105 for the motor and inverter of FIG. 14 operating at 15 Hz. In this case, the d and q-axis curves are fairly constant compared with the examples of FIG. 13, and the stationary reference frame current curves 1306 and 1308 exhibit substantially no distortion or instability. FIG. 16 includes graphs 1600 and 1610 respectively showing the stationary reference frame and synchronous reference frame current spectrum curves 1402 and 1412 using the adaptive harmonic compensation component 103 for the operating conditions illustrated in FIG. 15 (FE and DC not shown). The graphs 1600 and 1600 show significant reductions in the harmonic content compared with the corresponding curves in FIG. 14.

Figure 17:
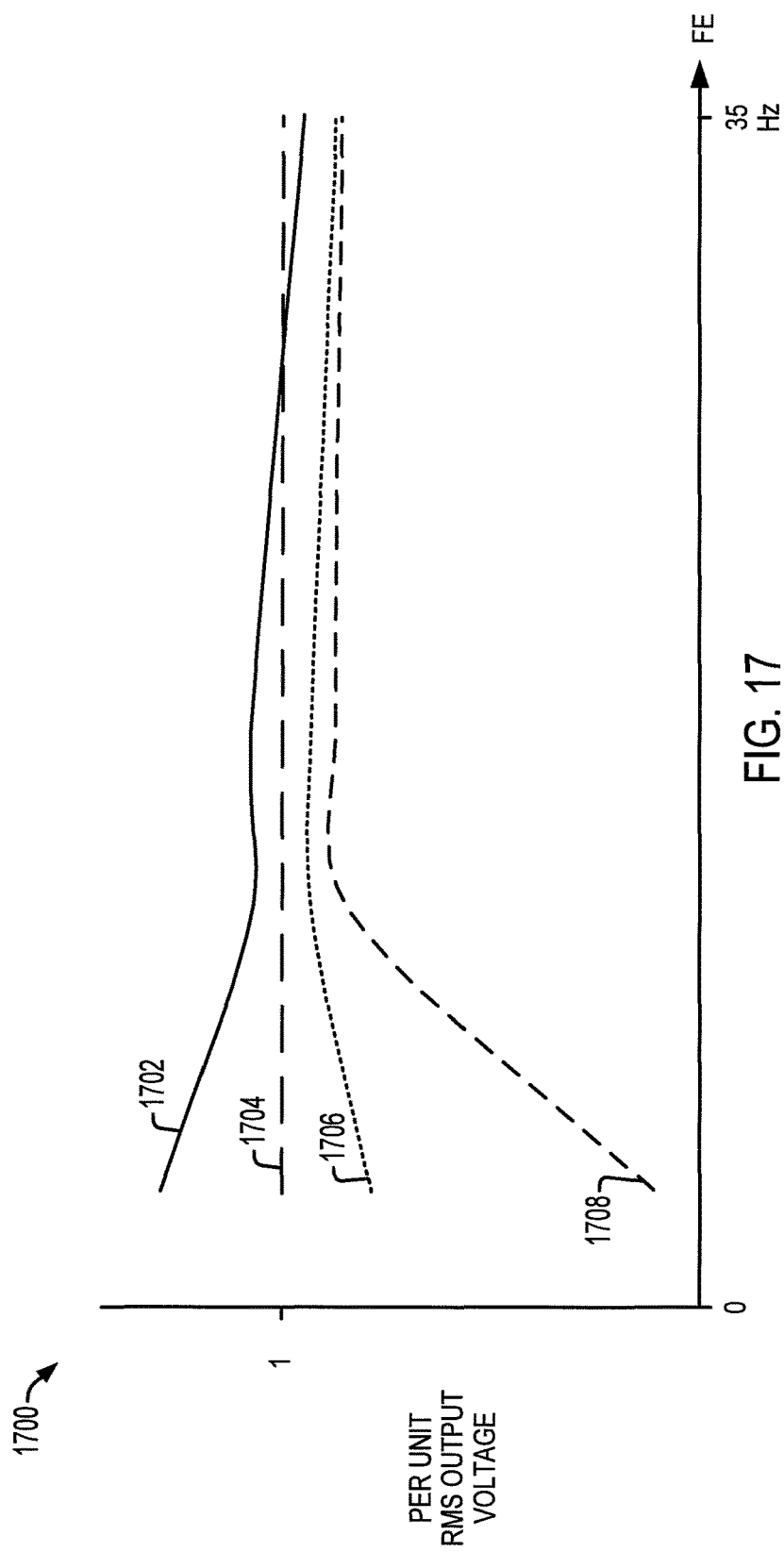
FIG. 17 is a graph.

FIG. 17 includes a graph 1700 illustrating output voltage dead time compensation performance for different dead time compensation conditions with respect to line-line RMS voltage in per unit (PU) scaling for a 15 hp no-load motor using a 4 kHz carrier frequency as a function of operating frequency from 3 Hz to 30 Hz. A first curve 1702 in FIG. 17 illustrates example operation of the above-described adaptive harmonic compensation and dead time compensation feedforward implementations. A second curves 1704 in FIG. 17 shows ideal operation with no dead time distortion. A curve 1706 in FIG. 17 illustrates compensation performance for other dead time compensation techniques that are dependent upon accurate characterization of the current polarity, and a curve 1708 illustrates performance with no dead time compensation. No compensation (curve 1708) results in very low output voltage at low frequencies and less than ideal voltage. The current polarity dependent compensation approach (curve 1706) improves the output voltage and low frequencies, but is still less than ideal. The example adaptive harmonic elimination approach (curve 1702) generates a higher output voltage in the low frequency region acting as a boost, and provides rated voltage across the operating region.

Figure 18:
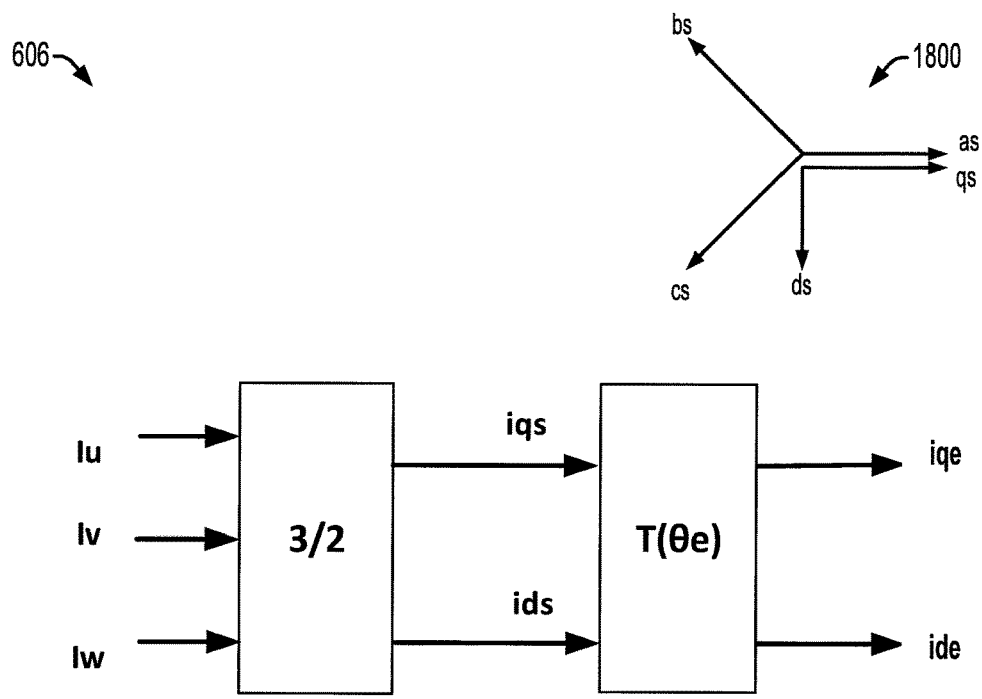
FIG. 18 is a block diagram.
Figure 19:
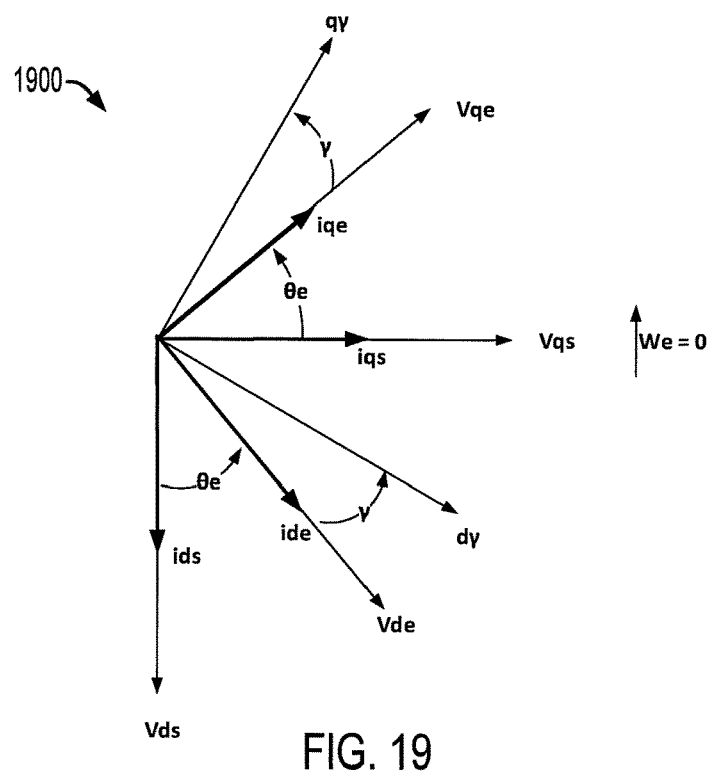
FIG. 19 is a vector diagram.

FIG. 18 illustrates one example of transformation from the stationary reference frame to the synchronous reference frame in the synchronous reference frame component 606 in FIG. 6 above. FIG. 18 also includes a vector diagram 1800 illustrating the transformation for stationary reference frame vectors as, bs and cs to synchronous reference frame vectors ds and qs. In this example, the component 606 transforms the stationary reference frame current values iu, iv and iw to generate synchronous reference frame current values iqs and ids, where iqs=2iu/3−iv/3−iw/3, and ids=−iv/($3^{-2}$)+iw/($3^{-2}$). FIG. 19 shows a further vector diagram 1900 for the stationary to synchronous transformation, where:

$$iqe = iqs*\cos(\theta e) - ids*\sin(\theta e),$$

$$ide = iqs*\sin(\theta e) + ids*\cos(\theta e), \text{ and}$$

$$0 = \omega e(t).$$

The transformation for T in one example is:

$$\begin{bmatrix} iqe \\ ide \end{bmatrix} = \begin{bmatrix} \cos(\theta e) & -\sin(\theta e) \\ \sin(\theta e) & \cos(\theta e) \end{bmatrix} \begin{bmatrix} iqs \\ ids \end{bmatrix}$$

The input to the DTC voltage calculation component 606 from the angle calculation component 602 includes GAMMA, which can be computed from the transformed current of the 3-2 phase synchronous reference frame computation component 600 as follows:

$$\mathrm{GAMMA}(\gamma) = \tan^{-1} \frac{iqe}{ide}$$

The result compensation voltage matrix in synchronous reference frame in the DTC voltage calculation component 606 is given by:

$$\begin{bmatrix} VqeDtc \\ VdeDtc \end{bmatrix} = Vdt \begin{bmatrix} \sin(\gamma) \\ \cos(\gamma) \end{bmatrix}.$$

The vector diagram 1900 in FIG. 19 relates the angles GAMMA (γ) and θe, and shows that the error in the fundamental voltage is in phase with the current vector, and resolves the error in its D and Q components. The diagram 1900 shows the voltage error and phase currents indicating the errors are in phase with the phase currents.

Figure 20:
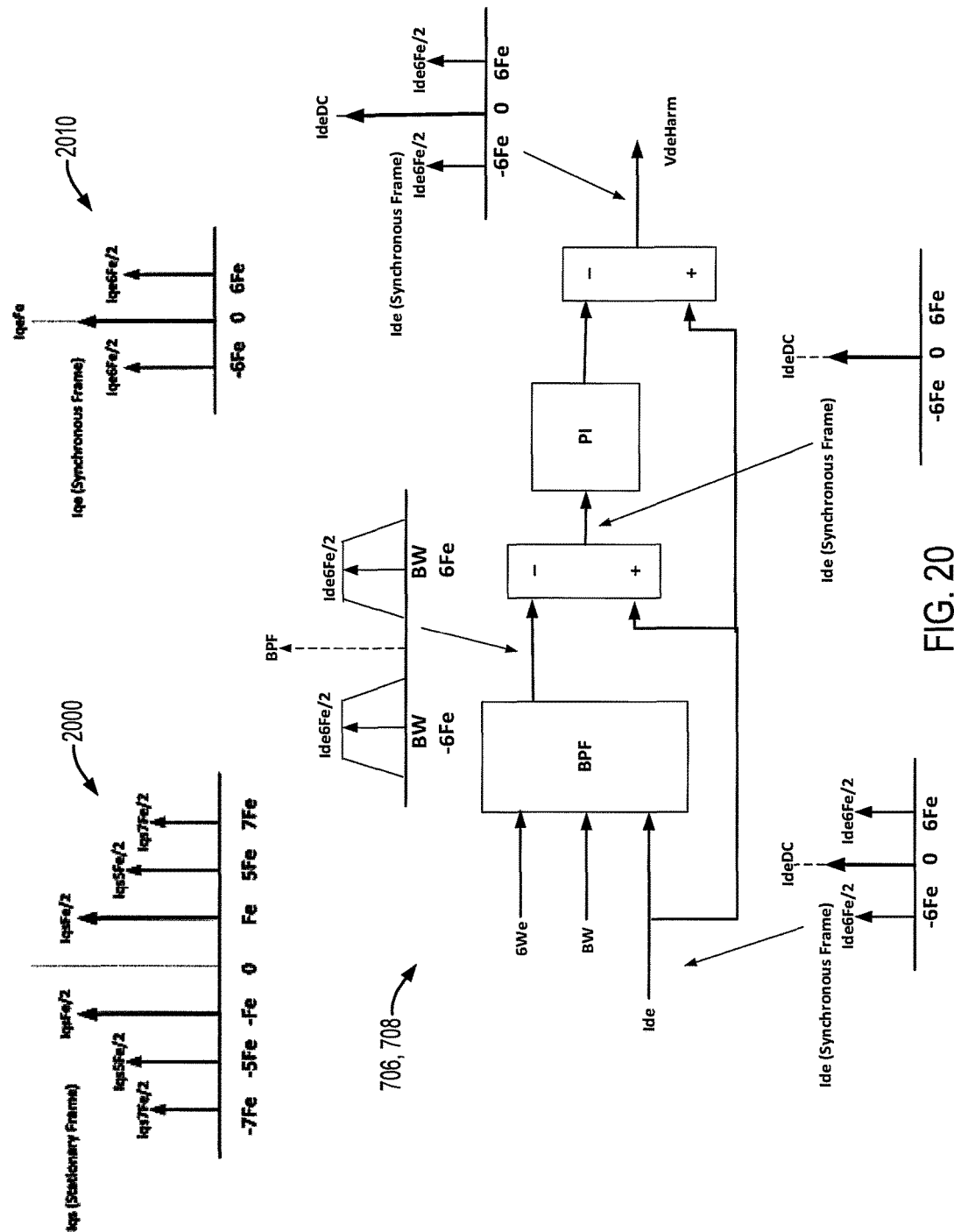
FIG. 20 is a schematic diagram.
Figure 21:
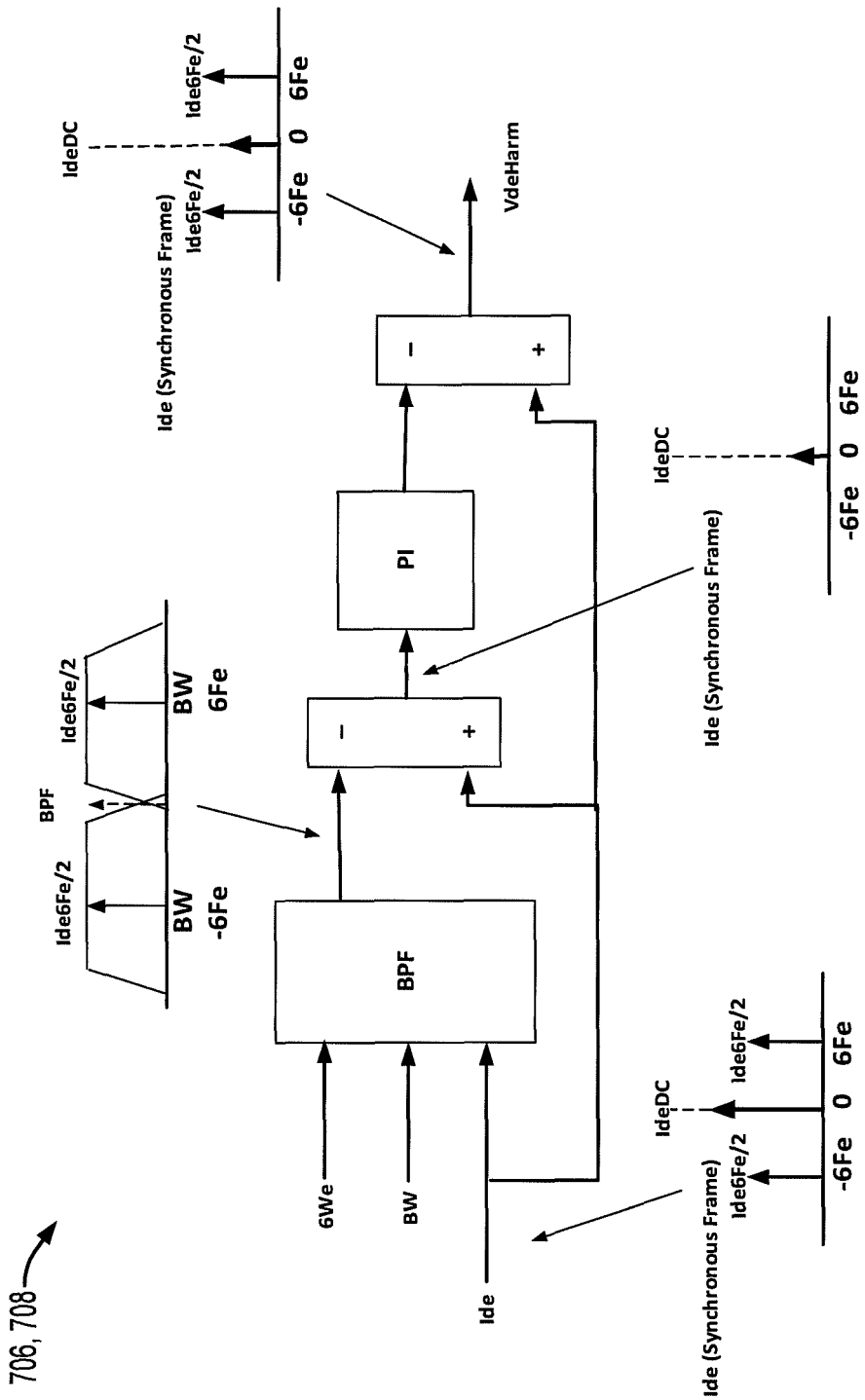
FIG. 21 is a schematic diagram.

FIGS. 20 and 21 illustrate effects of bandwidth on performance of a given filter type in the filter components 706 and 708 of FIG. 7 above. If the bandwidth BW is too wide or broad for a notch/bandpass filter, the filter may capture a portion of the DC values, particularly at low values of the electrical frequency Fe, and reduce the intended performance and increased the DC component. FIG. 20 illustrates operation for a relatively narrow bandwidth BW, which leads to a predominant DC component IdeDC in the voltage error VDEHARM. The example of FIG. 21 shows operation with a wider bandwidth BW, leading to the synchronous reference frame current spectrum having a reduced relative DC amplitude IdeDC compared to the harmonic values Ide6Fe/2 in the voltage error VDEHARM.

Figure 22:
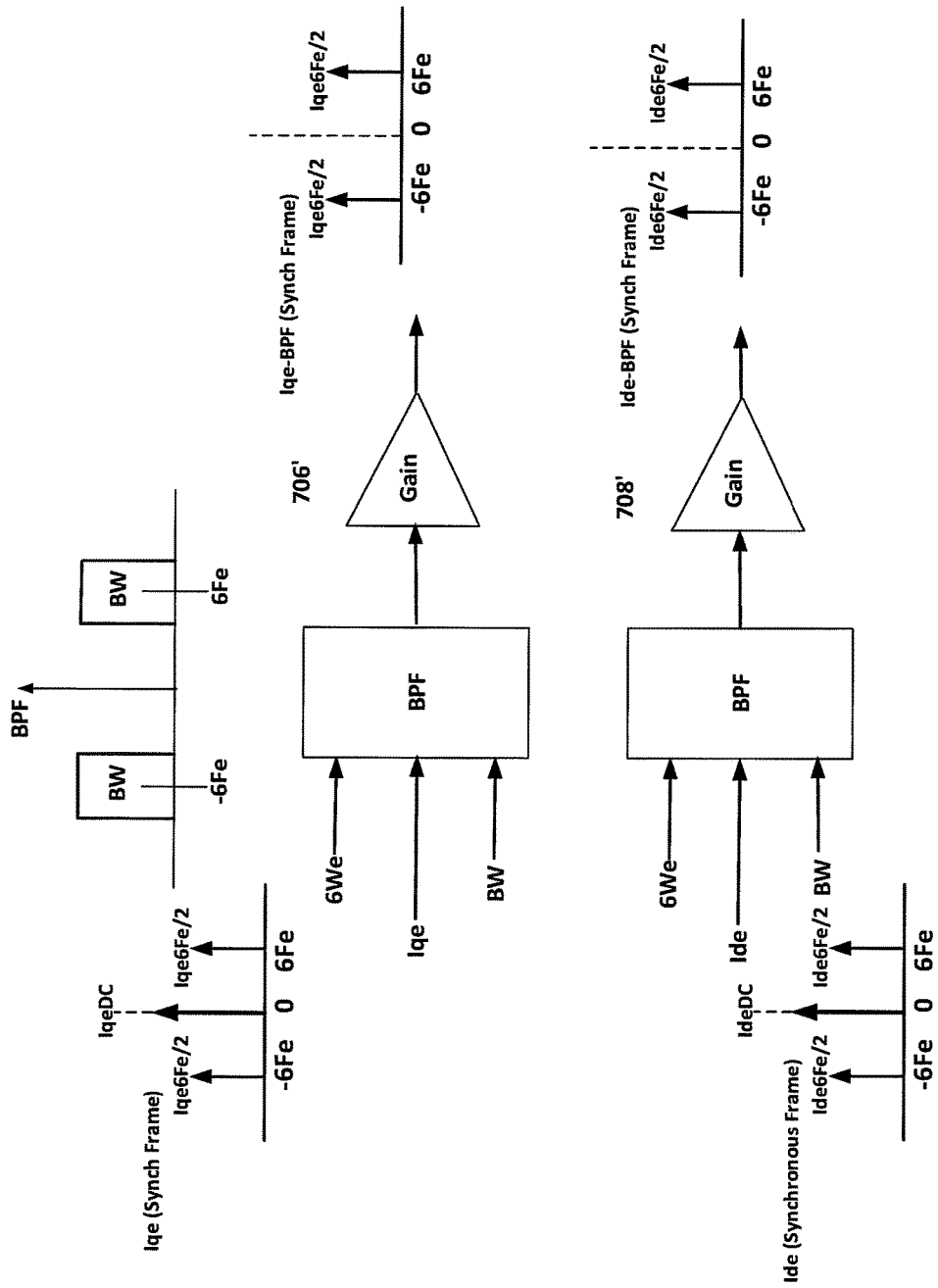
FIG. 22 is a schematic diagram.

FIG. 22 shows one non-limiting alternative implementation for the filter components 706 and 708 in FIG. 7 above. This example includes filter components 706' and 708' that use a band pass filter (BPF) instead of a complex tracking filter to extract the dominant synchronous frame sixth harmonic, in which the input is the same, and the outputs from the PI component are the voltage error values VDEHARM and VQEHARM.

Figure 23:
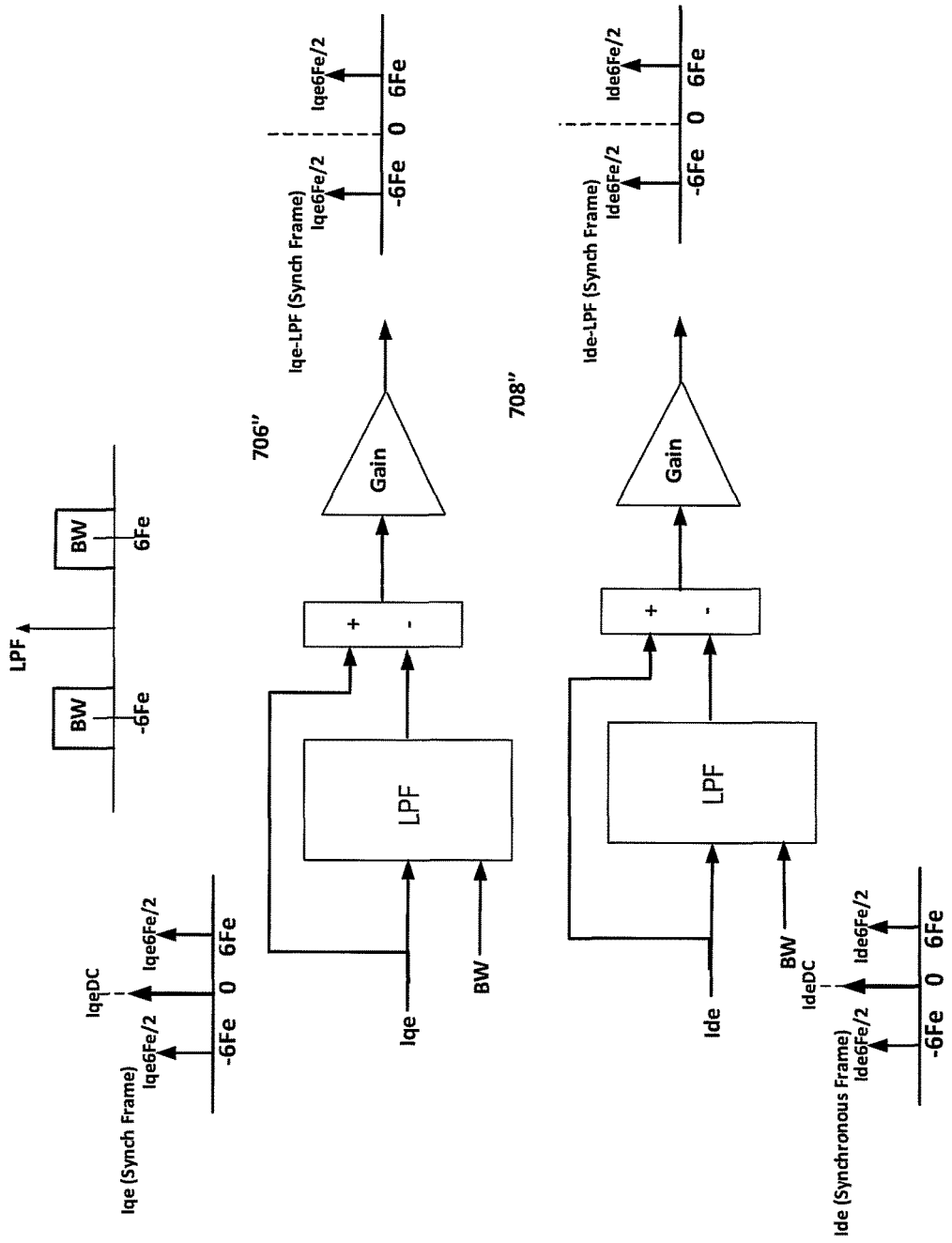
FIG. 23 is a schematic diagram.

FIG. 23 shows another alternative implementation for the filter components 706' and 708' that uses a low pass filter (LPF) to remove the DC components in the iqe/ide inputs and leaves only the sixth harmonic, in which the inputs are iqe/ide and BW only, and the output to the PI is the same.

Figure 24:
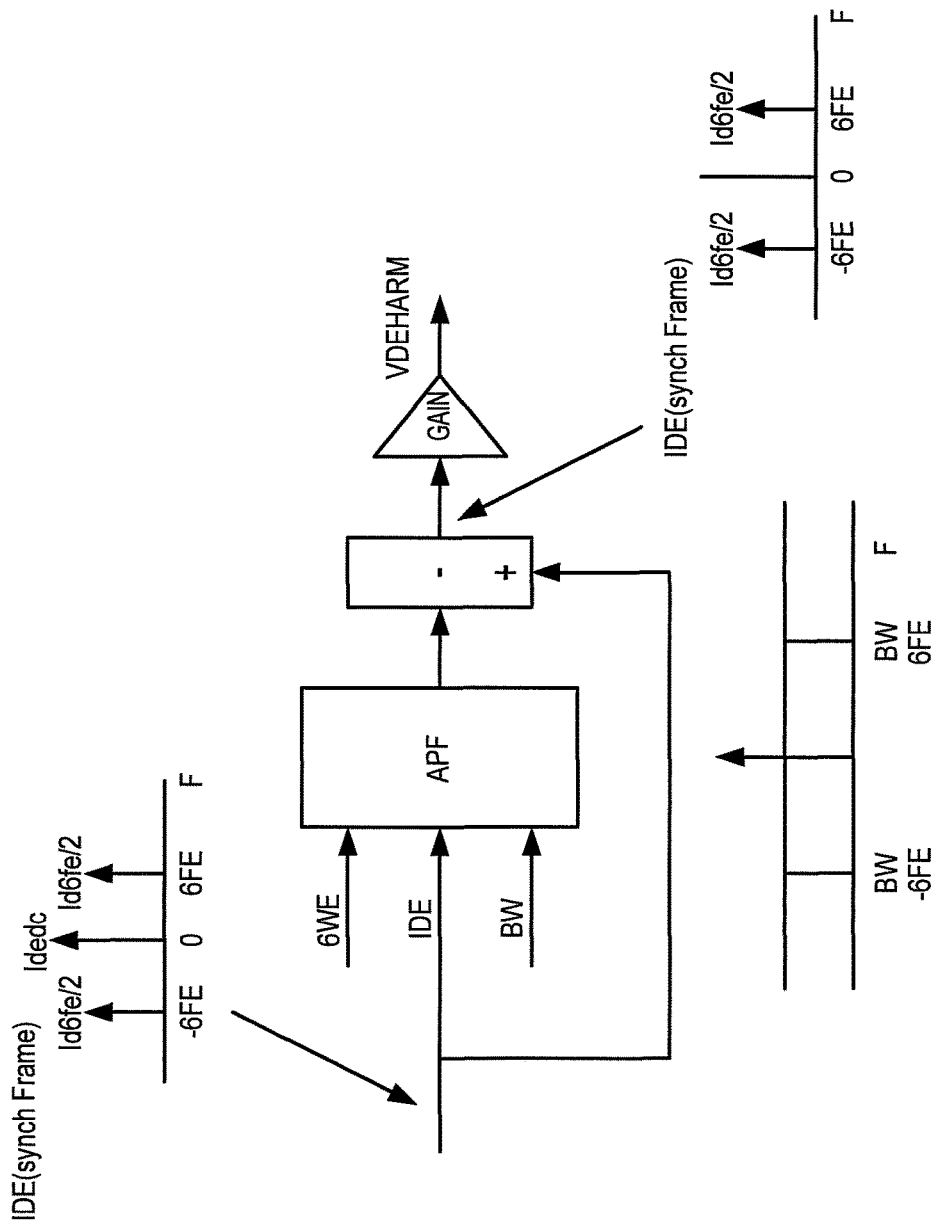
FIG. 24 is a schematic diagram.

FIG. 24 shows an implementation for the filter components 706 and 708 that uses an all-pass filter (APF) for generating VDEHARM and VQEHARM. In this example, the APF has a transfer function $H(s)=(s^2-(\omega_0/Q)s+\omega_0^2)/(s^2+(\omega_0/Q)s+\omega_0^2)$. The APF in one example rejects a particular frequency, in one example, the sixth harmonic 6*FE, and provide VDEHARM and VQEHARM with only the $6^{th}$ harmonic.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled in the art to practice the disclosed subject matter, including making and using any devices or systems and performing any incorporated methods. It will be evident that various modifications and changes may be made, and additional embodiments may be implemented, without departing from the broader scope of the present disclosure as set forth in the following claims, wherein the specification and drawings are to be regarded in an illustrative rather than restrictive sense.

The following is claimed:

1. A power conversion system, comprising:
   a rectifier, including an input to receive an AC input signal, and an output to provide a DC bus voltage signal;
   an inverter, including an inverter input connected to receive the DC bus voltage signal, and an inverter output to provide an AC output current signal to drive a load; and
   a controller, including a processor configured to execute program instructions from an electronic memory to:
      compute an angle of the AC output current signal,
      compute a first voltage error that represents an inverter switch dead time voltage error in a synchronous reference frame according to the angle,
      compute a second voltage error that represents a harmonic voltage error in the synchronous reference frame according to the angle, and according to an operating frequency of the inverter,
      compute a compensated voltage command according to the first voltage error, according to the second voltage error, and according to a voltage control reference, and
   control the AC output of the inverter according to the compensated voltage command.

2. The power conversion system of claim 1, wherein the processor is configured to execute the program instructions to compute the first voltage error independent of a polarity of the AC output current signal.

3. The power conversion system of claim 1, wherein the processor is configured to execute the program instructions to compute the second voltage error that represents the harmonic voltage error at a sixth harmonic of the operating frequency of the inverter in the synchronous reference frame.

4. The power conversion system of claim 3, wherein the processor is configured to execute the program instructions to compute the second voltage error that represents the harmonic voltage error at a fifth harmonic, the sixth harmonic, and a seventh harmonic of the operating frequency of the inverter in a stationary reference frame.

5. The power conversion system of claim 3, wherein the processor is configured to execute the program instructions to compute the first voltage error according to a dead time value, according to the DC bus voltage signal, and according to the angle.

6. The power conversion system of claim 1, wherein the processor is configured to execute the program instructions to compute the second voltage error that represents the harmonic voltage error at a fifth harmonic and a seventh harmonic of the operating frequency of the inverter in a stationary reference frame.

7. The power conversion system of claim 1, wherein the processor is configured to execute the program instructions to compute the first voltage error according to a dead time value, according to a DC bus voltage, and according to the angle.

8. A controller to operate a power conversion system, the controller comprising:
an electronic memory; and
a processor configured to execute program instructions from the electronic memory to:
compute an angle of an AC output current signal,
compute a first voltage error that represents an inverter switch dead time voltage error in a synchronous reference frame according to the angle,
compute a second voltage error that represents a harmonic voltage error in the synchronous reference frame according to the angle, and according to an operating frequency of the inverter,
compute a compensated voltage command according to the first voltage error and according to a voltage control reference, and control an inverter according to the compensated voltage command,
compute a compensated voltage command according to the first voltage error, according to the second voltage error, and according to the voltage control reference, and
control an inverter according to the compensated voltage command.

9. The controller of claim 8, wherein the processor is configured to execute the program instructions to compute the first voltage error independent of a polarity of the AC output current signal.

10. The controller of claim 8, wherein the processor is configured to execute the program instructions to compute the second voltage error that represents the harmonic voltage error at a sixth harmonic of the operating frequency of the inverter in the synchronous reference frame.

11. The controller of claim 10, wherein the processor is configured to execute the program instructions to compute the second voltage error that represents the harmonic voltage error at a fifth harmonic, the sixth harmonic, and a seventh harmonic of the operating frequency of the inverter in a stationary reference frame.

12. The controller of claim 10, wherein the processor is configured to execute the program instructions to compute the first voltage error according to a dead time value, according to a DC bus voltage, and according to the angle.

13. The controller of claim 8, wherein the processor is configured to execute the program instructions to compute the second voltage error that represents the harmonic voltage error at a fifth harmonic and a seventh harmonic of the operating frequency of the inverter in a stationary reference frame.

14. The controller of claim 8, wherein the processor is configured to execute the program instructions to compute the first voltage error according to a dead time value, according to a DC bus voltage, and according to the angle.

15. A method of operating a power conversion system, comprising:
computing an angle of an AC output current signal;
computing a first voltage error that represents an inverter switch dead time voltage error in a synchronous reference frame according to the angle;
computing a second voltage error that represents a harmonic voltage error in the synchronous reference frame according to the angle, and according to an operating frequency of the inverter;
computing a compensated voltage command according to the first voltage error according to the second voltage error, and according to a voltage control reference; and
controlling an inverter according to the compensated voltage command.

16. The method of claim 15, further comprising computing the first voltage error independent of a polarity of the AC output current signal.

17. The method of claim 15, further comprising computing the second voltage error that represents the harmonic voltage error at a sixth harmonic of the operating frequency of the inverter in the synchronous reference frame.

18. The method of claim 15, further comprising computing the second voltage error that represents the harmonic voltage error at a fifth harmonic, the sixth harmonic, and a seventh harmonic of the operating frequency of the inverter in a stationary reference frame.

19. The method of claim 15, further comprising computing the first voltage error according to a dead time value, according to the DC bus voltage signal, and according to the angle.

* * * * *